US010096073B2

(12) United States Patent
Groeneveld

(10) Patent No.: US 10,096,073 B2
(45) Date of Patent: Oct. 9, 2018

(54) SYSTEMS TO PRESCRIBE AND DELIVER FERTILIZER OVER AGRICULTURAL FIELDS AND RELATED METHODS

(71) Applicant: The Climate Corporation, San Francisco, CA (US)

(72) Inventor: David P. Groeneveld, Santa Fe, NM (US)

(73) Assignee: The Climate Corporation, San Francisco, CA (US)

(*) Notice: Subject to any disclaimer, the term of this patent is extended or adjusted under 35 U.S.C. 154(b) by 61 days.

(21) Appl. No.: 15/048,753

(22) Filed: Feb. 19, 2016

(65) Prior Publication Data

US 2016/0180473 A1 Jun. 23, 2016

Related U.S. Application Data

(63) Continuation-in-part of application No. 14/676,660, filed on Apr. 1, 2015, now abandoned, and a
(Continued)

(51) Int. Cl.
*G06Q 50/02* (2012.01)
*G06Q 10/06* (2012.01)
(Continued)

(52) U.S. Cl.
CPC ........... *G06Q 50/02* (2013.01); *A01B 79/005* (2013.01); *A01C 21/00* (2013.01); *A01G 22/00* (2018.02);
(Continued)

(58) Field of Classification Search
CPC ........ A01G 25/16; A01G 1/001; A01G 22/00; A01M 17/00; A01M 17/008;
(Continued)

(56) References Cited

U.S. PATENT DOCUMENTS 5,764,879 A   6/1998   Skarpelos et al.
6,212,824 B1  4/2001   Orr et al.
(Continued)

FOREIGN PATENT DOCUMENTS

CA      2837484       12/2012
WO    2012094256       7/2012

OTHER PUBLICATIONS

W.M. Baugh & D.P. Groeneveld, "Broadband vegetation index performance evaluated for a low-cover environment"; International Journal of Remote Sensing, vol. 27, Nos. 21-22, pp. 4715-4730, Nov. 2006; available at http://www.tandf.co.uk/journals.
(Continued)

*Primary Examiner* — Joshua D Huson
(74) *Attorney, Agent, or Firm* — Hickman Palermo Becker Bingham LLP

(57) ABSTRACT

Some embodiments include a method. The method can include mapping a spatial pattern of yield for a crop of an agricultural field and prescribing spatially-variable application rates of one or more nutrients for the agricultural field. Other embodiments of related methods and systems are also disclosed.

15 Claims, 15 Drawing Sheets

Related U.S. Application Data continuation-in-part of application No. 14/676,687, filed on Apr. 1, 2015, now Pat. No. 9,756,844, and a continuation-in-part of application No. 13/455,987, filed on Apr. 25, 2012, now abandoned, said application No. 14/676,660 is a continuation-in-part of application No. 13/455,987, filed on Apr. 25, 2012, now abandoned, and a continuation-in-part of application No. 13/455,971, filed on Apr. 25, 2012, now Pat. No. 9,131,642, said application No. 14/676,687 is a continuation-in-part of application No. 13/455,987, filed on Apr. 25, 2012, now abandoned, and a continuation-in-part of application No. 13/455,971, filed on Apr. 25, 2012, now Pat. No. 9,131,642.

(60) Provisional application No. 61/490,499, filed on May 26, 2011, provisional application No. 61/486,193, filed on May 13, 2011, provisional application No. 61/973,757, filed on Apr. 1, 2014.

(51) Int. Cl.
*A01G 22/00* (2018.01)
*A01B 79/00* (2006.01)
*A01C 21/00* (2006.01)

(52) U.S. Cl.
CPC . *G06Q 10/06313* (2013.01); *G06Q 10/06315* (2013.01); *A01C 21/007* (2013.01)

(58) Field of Classification Search
CPC ............ G05D 2201/0201; A01B 79/02; A01B 79/005; A01C 21/007; A01C 21/00; A01C 21/005; G06Q 50/02; G06Q 10/06313; G06Q 10/06315
See application file for complete search history.

(56) References Cited

U.S. PATENT DOCUMENTS

| | | | |
|---|---|---|---|
| 6,366,681 B1 | 4/2002 | Hutchins | |
| 6,393,927 B1 | 5/2002 | Biggs et al. | |
| 6,505,146 B1 | 1/2003 | Blackmer | |
| 6,549,852 B2 | 4/2003 | Hanson | |
| 6,947,811 B2 | 9/2005 | Addink et al. | |
| 7,058,197 B1 | 6/2006 | McGuire et al. | |
| 7,068,816 B1 | 6/2006 | Knoblauch et al. | |
| 7,171,912 B2 | 2/2007 | Fraisse et al. | |
| 7,723,660 B2 | 5/2010 | Holland | |
| 8,855,937 B2 * | 10/2014 | Lindores | A01B 79/005 702/19 |
| 9,058,633 B2 * | 6/2015 | Lindores | G06Q 10/06 |
| 9,131,642 B2 | 9/2015 | Groeneveld | |
| 9,408,342 B2 * | 8/2016 | Lindores | G06F 17/30241 |
| 9,756,844 B2 * | 9/2017 | Groeneveld | A01M 17/00 |
| 9,846,848 B2 * | 12/2017 | Lindores | G06Q 10/06 |
| 2001/0036295 A1 | 11/2001 | Hendrickson et al. | |
| 2003/0019152 A1 | 1/2003 | Raun | |
| 2004/0236443 A1 | 11/2004 | Ware et al. | |
| 2004/0237394 A1 | 12/2004 | Mayfield et al. | |
| 2005/0165552 A1 * | 7/2005 | Fraisse | A01B 49/06 702/2 |
| 2005/0234691 A1 | 10/2005 | Singh et al. | |
| 2006/0161309 A1 | 7/2006 | Moore et al. | |
| 2007/0186830 A1 | 8/2007 | Fraisse et al. | |
| 2008/0097653 A1 | 4/2008 | Kaprielian et al. | |
| 2009/0007485 A1 | 1/2009 | Holland | |
| 2009/0259483 A1 | 10/2009 | Hendrickson | |
| 2009/0326723 A1 | 12/2009 | Moore et al. | |
| 2012/0101634 A1 * | 4/2012 | Lindores | G06F 17/30241 700/266 |
| 2012/0101784 A1 | 4/2012 | Lindores et al. | |
| 2012/0101861 A1 * | 4/2012 | Lindores | G06Q 10/06 705/7.11 |
| 2012/0101934 A1 * | 4/2012 | Lindores | G06Q 10/06 705/37 |
| 2012/0109614 A1 * | 5/2012 | Lindores | A01B 79/005 703/11 |
| 2013/0104455 A1 | 5/2013 | Groeneveld | |
| 2014/0012732 A1 * | 1/2014 | Lindores | A01B 79/005 705/37 |
| 2015/0201605 A1 | 7/2015 | Groeneveld | |
| 2015/0206255 A1 | 7/2015 | Groeneveld | |
| 2015/0278966 A1 * | 10/2015 | Johnson | G06Q 50/02 702/2 |

OTHER PUBLICATIONS

W.M. Baugh & D.P. Groeneveld, "Correcting satellite data to detect vegetation signal for eco-hydrolic analyses"; Journal of Hydrology vol. 344, Issues 1-2, pp. 135-145 Sep. 30, 2007; available at http://elsevier.com/locate/jhydrol.

W.M. Baugh & D.P. Groeneveld, "Annual groundwater evaporation mapped from single satellite scenes"; Journal of Hydrology vol. 344, Issues 1-2, pp. 146-156, Sep. 30, 2007; available at www.elsevier.com/locate/jhydrol;.

Compton Tucker, "Red and Photographic Infrared Linear Combinations for Monitoring Vegetation"; Remote Sensing of Environment 8:127-150, Earth Resources Branch, NASA/Goddard Space Flight Center, Greenbelt, Maryland 20771; Elsevier North Holland Inc. Aug. 1, 1979.

\* cited by examiner

1505

| Identifying at least one prior crop-growing season NDVI* map of the multiple prior crop-growing season NDVI* maps comprising aberrant NDVI* data of the NDVI* data | ---- 1601 |

↓

| Excluding the prior crop-growing season NDVI* map(s) of the multiple prior crop-growing season NDVI* maps when averaging the corresponding pixels of the multiple prior crop-growing season NDVI* maps to form the averaged pixels of the average NDVI* map | ---- 1602 |

| Determining a target yield for the crop of the agricultural field for an upcoming crop-growing season | ---- 1701 |

↓

| Calculating a provisional average nutrient (e.g., nitrogen) application rate for the target yield for the crop of the agricultural field | ---- 1702 |

↓

| Determining an average nutrient (e.g., nitrogen) credit of the crop of the agricultural field for a prior crop-growing season of the multiple prior crop-growing seasons | ---- 1703 |

↓

| Determining an average nitrogen loss of the soil of the agricultural field | ---- 1704 |

↓

| Calculating a final average nutrient (e.g., nitrogen) application rate for the target yield for the crop of agricultural field | ---- 1705 |

↓

| Calculating a linear slope for an average NDVI* map-based nutrient application guide by dividing the final average nutrient (e.g., nitrogen) application rate by a median NDVI* value of the averaged pixels of the average NDVI* map | ---- 1706 |

┌─────────────────────────────────────────────────────────────────────────┐
│ Identifying with a global positioning system a position of farm equipment at the agricultural │
│ field, the farm equipment being configured to apply the nutrient(s) (e.g., nitrogen) to the │
│ agricultural field, and associating the position of the farm equipment with a related pixel of │ ⸺ 1801
│ the averaged pixels of the average NDVI* map of the agricultural field to determine a rate of │
│ the nutrient(s) (e.g., nitrogen) to be applied to the agricultural field by the farm equipment │
└─────────────────────────────────────────────────────────────────────────┘
                                        ▼
┌─────────────────────────────────────────────────────────────────────────┐
│ Communicating the average NDVI* map-based nutrient application guide to a farming │ ⸺ 1802
│ operation │
└─────────────────────────────────────────────────────────────────────────┘

┌─────────────────────────────────────────────────────────────────────────┐
│ Providing a mapping system                                              │ ⸺ 1901
└─────────────────────────────────────────────────────────────────────────┘
                                        ▼
┌─────────────────────────────────────────────────────────────────────────┐
│ Providing a prescription system                                         │ ⸺ 1902
└─────────────────────────────────────────────────────────────────────────┘
                                        ▼
┌─────────────────────────────────────────────────────────────────────────┐
│ Providing an administration system                                      │ ⸺ 1903
└─────────────────────────────────────────────────────────────────────────┘

FIG. 19

SYSTEMS TO PRESCRIBE AND DELIVER FERTILIZER OVER AGRICULTURAL FIELDS AND RELATED METHODS

CROSS-REFERENCE TO RELATED APPLICATIONS

This is a continuation-in-part application of (i) U.S. Non-Provisional patent application Ser. No. 13/455,987, filed Apr. 25, 2012, (ii) U.S. Non-Provisional patent application Ser. No. 14/676,660, filed Apr. 1, 2015, and (iii) U.S. Non-Provisional patent application Ser. No. 14/676,687, filed Apr. 1, 2015.

U.S. Non-Provisional patent application Ser. No. 13/455,987 claims the benefit of U.S. Provisional Patent Application No. 61/490,499, filed May 26, 2011, and claims the benefit of U.S. Provisional Patent Application No. 61/486,193, filed May 13, 2011.

Further, U.S. Non-Provisional patent application Ser. No. 14/676,660 is a continuation-in-part application of (i) U.S. Non-Provisional patent application Ser. No. 13/455,987, and (ii) U.S. Non-Provisional patent application Ser. No. 13/455,971, filed Apr. 25, 2012, and which issued as U.S. Pat. No. 9,131,642 on Sep. 15, 2015. Also, U.S. Non-Provisional patent application Ser. No. 14/676,660 claims the benefit of U.S. Provisional Patent Application No. 61/973,757, filed Apr. 1, 2014.

Further still, U.S. Non-Provisional patent application Ser. No. 14/676,687 is a continuation-in-part application of (i) U.S. Non-Provisional patent application Ser. No. 13/455,987, and (ii) U.S. Pat. No. 9,131,642. Also, U.S. Non-Provisional patent application Ser. No. 14/676,660 claims the benefit of U.S. Provisional Patent Application No. 61/973,757.

Meanwhile, U.S. Pat. No. 9,131,642, claims the benefit of U.S. Provisional Patent Application No. 61/490,499 and claims the benefit of U.S. Provisional Patent Application No. 61/486,193.

U.S. Pat. No. 9,131,642, U.S. Non-Provisional patent application Ser. No. 13/455,987, U.S. Non-Provisional patent application Ser. No. 14/676,660, U.S. Non-Provisional patent application Ser. No. 14/676,687, U.S. Provisional Patent Application No. 61/490,499, U.S. Provisional Patent Application No. 61/486,193, and U.S. Provisional Patent Application No. 61/973,757 are incorporated herein by reference in their entirety.

FIELD OF THE INVENTION

This invention relates generally to systems to prescribe and deliver fertilizer over agricultural fields, and relates more particularly to such systems to prescribe and deliver fertilizer over agricultural fields with discrete targeting and at variable application rates by using remote sensing and related methods.

DESCRIPTION OF THE BACKGROUND

Various reasons may exist for using fertilizer efficiently. For example, as fertilizer prices rise as a result of increasing energy and/or mineral costs, farming operations (e.g., farmers) may be incentivized to use fertilizer as efficiently as possible, such as, for example, by using only what fertilizer is needed to fertilize agricultural fields, in order to minimize fertilizer expenses. Meanwhile, using fertilizer efficiently offers more than just economic value. Groundwater beneath many farmed regions throughout the United States (e.g., the central United States) has become polluted with quantities of nitrate far exceeding safe drinking water standards. Over-fertilization of agricultural fields may cause such nitrate pollution of groundwater as a result of fertilizer leaching with precipitation or irrigation through and below crop root zones.

Because soil across agricultural fields may vary, one or more areas of an agricultural field may have different growing conditions (e.g., chemical and/or physical conditions) than one or more other areas of the agricultural field. For example, one or more areas of the agricultural field may have less favorable growing conditions than one or more other areas of the agricultural field. As a result, one or more areas of an agricultural field may have different fertilizer needs than one or more other areas of the agricultural field. Accordingly, various conventional systems and/or methods for prescribing and delivering fertilizer over areas of agricultural fields having varying growing conditions have been developed with the intent of helping farming operations use fertilizer more efficiently.

Some conventional systems for prescribing and delivering fertilizer over areas of agricultural fields having varying growing conditions use localized sensing to determine a quantity and/or type of fertilizer to provide to the different areas. For example, these conventional systems may sample the soil of an agricultural field at multiple separate soil sampling locations (e.g., at least one soil sampling location per area) to determine a quantity and/or type of fertilizer to provide to the different areas. Unfortunately, in practice, the costs of implementing localized sensing may negate some or all of the savings that might be realized from reduced fertilizer expenses and/or increased income from enhanced yields that may result from using the localized sensing. For example, the equipment infrastructure needed to sample soil at the multiple separate soil sampling locations may be expensive and/or difficult to install, operate, and/or maintain. Meanwhile, because the accuracy of localized sensing depends on the quantity of soil sampling locations analyzed, attempts to reduce the costs of implementing localized sensing by limiting a quantity of soil sampling locations would result in a corresponding decrease in the accuracy, and consequently the effectiveness of implementing localized sensing.

Further conventional systems for prescribing and delivering fertilizer over areas of agricultural fields having varying growing conditions use remote sensing (e.g., aerial or spatial measurements) to determine a quantity and/or type of fertilizer to provide to the different areas. For example, these conventional systems may apply a graphical indicator such as a vegetation index to analyze measurements obtained by remote sensing to determine a quantity and/or type of fertilizer to provide to the different areas.

An exemplary vegetation index used by conventional systems implementing remote sensing may include a normalized difference vegetation index (NDVI). The NDVI provides a ratio indicative of the density of vegetation using measurements of the visible red and near-infrared light reflected by vegetation (i.e., reflectance). Unfortunately, the accuracy of using the NDVI as a graphical indicator from one period of time (e.g., a minute, an hour, a day, a week, a month, a year, etc.) to the next, such as, for example, in expressing growth curves or in comparing agricultural fields over periods of time may be compromised by the effects of atmospheric aerosols and/or soil background. For example, aerosols can impact reflectance by scattering and/or attenuating light, resulting in an NDVI value that inaccurately represents the actual density of vegetation present. Meanwhile, because the NDVI of bare soil is typically greater than zero, and sometimes considerably greater than zero, the NDVI value of soil background can suggest vegetation is present even where no vegetation is present. Consequently, many conventional systems using the NDVI as a vegetation index have been unreliable for prescribing and delivering fertilizer over areas of agricultural fields having varying growing conditions because the NDVI only reliably permits comparison and calculation of vegetation across agricultural fields at contemporaneous moments in time and does not reliably permit comparison of vegetation between or over periods of time.

Some conventional systems that implement remote sensing for prescribing and delivering fertilizer over areas of agricultural fields having varying growing conditions have attempted to address the shortcomings of using NDVI as a vegetation index. However, these conventional systems still have their own shortcomings.

For example, one exemplary conventional system maps the nitrogen required by areas of an agricultural field to prepare for application of nitrogen fertilizer to the agricultural field. This conventional system uses remote sensing data to prescribe and deliver nitrogen for the agricultural field. However, in addition to using the remote sensing data, this conventional system relies on ground-based measurements of reflectance to calibrate an NDVI to remove atmospheric aerosol effects, and thus, is poorly scalable and suffers from similar shortcomings to those of localized sensing as discussed above. In particular, many farming operations lack the proper equipment and/or scientific know-how to calibrate and use the NDVI using ground-based measurements of reflectance. Further, such equipment and/or training is expensive and may be cost prohibitive for many farming operations. Meanwhile, this conventional system does nothing to account for soil background effects on the NDVI.

Another exemplary conventional system implementing an NDVI with remote sensing attempts to eliminate atmospherically-induced error in the NDVI by measuring the NDVI of vegetation just over the canopy of the vegetation. In particular, this conventional system uses sensors mounted on farm equipment, such as, for example, on tractor-dragged equipment or on the boom of center-pivot irrigation systems, to obtain remote sensing measurements. Although avoiding the error-inducing effects of atmospheric aerosols on the NDVI, this conventional system suffers from other problems that still prevent this conventional system from addressing the shortcomings of using NDVI as a vegetation index. For example, the close proximity to the ground of the sensors mounted on farm equipment may cause inconsistencies in remote sensing measurements taken by the sensors throughout the day due to changes in lighting resulting from changes in the position of the sun, cloud cover, haze, and/or twilight. These problems may become particularly significant where an agricultural field is sufficiently large such that fertilizing the agricultural field requires extended periods of time to complete. Even assuming clear skies, remote sensing measurements taken by the sensors of this conventional system may only be consistent for a few hours when the sun is near zenith. Meanwhile, sensors mounted on center pivot irrigation systems may require many days to make full circles and may necessitate nighttime measurements that this conventional system does not address.

Yet another exemplary conventional system implementing an NDVI with remote sensing uses an automated correction routine to compensate for atmospheric influences on the NDVI applied to remote sensing data. However, this conventional system does not correct the effects of soil background on the NDVI that may result in erroneous values of the NDVI applied to remote sensing measurements for agricultural fields having little or no vegetation.

By failing to account for the effects of soil background, this conventional system may be unable to reliably analyze early season remote sensing measurements (e.g., when crops are in early stages of development and/or before the canopy of the crops closes) and yet accurately analyzing early season remote sensing measurements may be critical to determining the timing of crop development. For example, values of the NDVI may be highly influenced by soil reflectance before the canopy of crops closes and remote sensing measurements taken during the period of time before the canopy of crops closes may be important for predicting a crop's growth stage. While this conventional system may use bare soil reflectance to map soil brightness, normalized from zero to one, soil brightness is not a correction for soil background and is not an appropriate tool to judge soil properties or fertility. Surface soil water content, along with the presence of crop residue in the form of leaves and stems left-over from the prior season, control the soil brightness perceived by remote sensing. Neither surface soil water content nor exposed crop residues are well correlated to agricultural soil properties or fertility.

Meanwhile, this conventional system is unreliable for prescribing and delivering fertilizer over areas of agricultural fields having varying growing conditions because the remote sensing analysis implemented by this conventional system may be insufficiently sensitive to evaluate a spatial distribution of crops in an agricultural field, such as, for example, when a leaf area index (LAI) of the crops is within an upper third of a potential LAI of the crops. LAI is a dimensionless measurement of the average number of leaf layers covering the ground across an agricultural field. For example, this conventional system uses a relationship between NDVI and LAI to map the LAI of the crops of an agricultural field. However, the relationship between NDVI and LAI for cultivated crops saturates at values of LAI of approximately four or five at which point NDVI no longer provides a reliable measure of LAI, and yet values of LAI exceeding seven are common for cultivated crops.

Further, this conventional system is unreliable for prescribing and delivering fertilizer over areas of agricultural fields having varying growing conditions because the conventional system does not determine when to obtain remote sensing data to analyze yield patterns of an agricultural field. The timing for a crop to display a spatial-yield pattern may be important for accurately prescribing and delivering fertilizer over an agricultural field. The conventional system only provides for obtaining remote sensing data during a particular window of time (e.g., a crop's last vegetative state). Because yield patterns of an agricultural field may vary, reliance on yield patterns during a particular window of time may cause an erroneous understanding of spatial yield and, therefore, any fertilizer prescription determined from it may be erroneous as well.

Accordingly, there is a need for improved systems and methods for prescribing and delivering fertilizer over areas of agricultural fields having varying growing conditions, such as, for example, so that each area of the agricultural fields receives only a quantity of fertilizer that is sufficient to permit that area to reach its particular yield potential. Further, such systems and methods are needed that can be implemented across farmed regions that may include multiple agricultural fields, such as, for example, so that the systems and methods can be implemented for the benefit of multiple farming operations.

BRIEF DESCRIPTION OF THE DRAWINGS

To facilitate further description of the embodiments, the following drawings are provided in which:

FIG. 16 illustrates an exemplary activity of mapping an average NDVI* map of the agricultural field by averaging corresponding pixels of the multiple prior crop-growing season NDVI* maps to form averaged pixels, according to the embodiment of FIG. 14;

FIG. 17 illustrates an exemplary activity of prescribing spatially-variable application rates of one or more nutrients (e.g., nitrogen) for the agricultural field, according to the embodiment of FIG. 14;

FIG. 18 illustrates an exemplary activity of facilitating applying the spatially-variable application rates of the nutrient(s) (e.g., nitrogen) to the agricultural field according to the average NDVI* map-based nutrient application guide, according to the embodiment of FIG. 14; and FIG. 19 illustrates a flow chart for an embodiment of a method 1900 of providing (e.g., manufacturing) a system.

Figure 1:
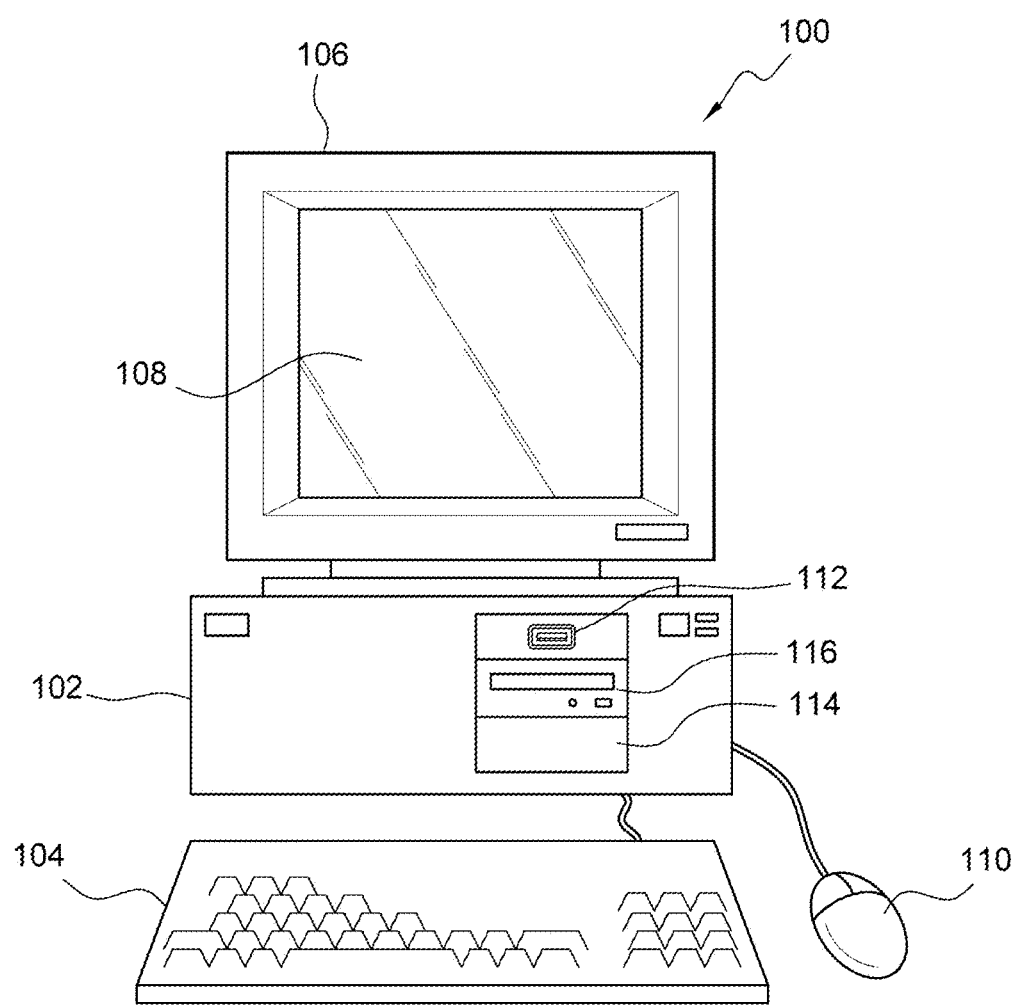
FIG. 1 illustrates a front elevational view of an exemplary computer system that is suitable to implement at least part of a central computer system and/or at least part of one or more farming operation computer systems of the system of FIG. 3 and/or to implement at least part of one or more of the activities of FIGS. 7-10 and/or FIGS. 14-18.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

Glossary of Abbreviations and Nomenclature

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

The term "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

The term "bu" refers to an abbreviated form of a bushel unit of weight.

The term "ac" refers to an abbreviated form of an acre unit of area.

The term "AED" refers to an abbreviated form of the term apparent emergence date, which may refer to a theoretical date determined by applying a clocking function to NDVI* data of an agricultural field m. The AED may be useful for timing crop stages for a crop of an agricultural field.

The term "clocking function" refers to a mathematical method for determining the AED for a crop of an agricultural field.

The term "DOY" refers to a day of a year. In some embodiments, the DOY can be numbered sequentially 1-365. In these or other embodiments, the DOY can consider or disregard the extra day corresponding to leap years.

The term "DOY'" refers to a predicted day of a year determined using the clocking function.

The terms "EOS" and "EOS data" refer to remote sensing data gathered by any aerial or spatial platform (e.g., vehicle) and stored in a digital form. Exemplary platforms can include satellites, manned aircraft, unmanned aircraft, etc. The remote sensing data can be stored and organized as raster data.

The term "farmed region" refers to an area of land having approximately homogenous climate conditions. In many examples, a "farmed region" can span a north-south distance of less than or equal to approximately 1.5 degrees of latitude (e.g., approximately 105 miles or 170 kilometers)). In further examples, a "farmed region" can span a north-south distance of less than or equal to approximately 3 degrees of latitude (e.g., approximately 210 miles or 340 kilometers).

The terms "agricultural field m" and "field m" refer to a hypothetical field for which nitrogen and other nutrients can be applied.

The term "NDVI" refers to an abbreviated form of a normalized difference vegetation index.

The term "NDVI*" refers to an abbreviated form of a normalized difference vegetation index that has been modified to compensate for atmospheric interference (e.g., light scatter and/or attenuation) and for soil background interference.

The term "raster" and "raster data" refer to a digital file comprising a matrix of pixels organized into rows and columns where each pixel comprises data relating to the pixel having the data.

The term "shapefile" refers to a vector data storage format for storing a location, a shape, and/or one or more attributes of a geographic feature. In many examples, the "shapefile" can refer to a vector data storage format of the Environmental Systems Research Institute (esri) of Redlands, Calif., United States of America.

The term "SSURGO-USDA Soil Survey Geographic Database" refers to an electronic database having soil data.

DETAILED DESCRIPTION OF EXEMPLARY EMBODIMENTS

Some embodiments include a method. The method can comprise: executing one or more first computer instructions configured to map a spatial pattern of yield for a crop of an agricultural field; and executing one or more second computer instructions configured to prescribe spatially-variable application rates of one or more nutrients for the agricultural field. The one or more first computer instructions and the one or more second computer instructions can be configured to run at one or more processors and configured to be stored at one or more non-transitory memory storage devices.

Further embodiments include a system. The system can comprise a mapping system configured to map a spatial pattern of yield for a crop of an agricultural field. Further, the system can comprise a prescription system configured to prescribe spatially-variable application rates of one or more nutrients for the agricultural field.

Other embodiments include a method to use EOS raster data to map a spatial pattern of yield for any crop type $\lambda$, on a field m, and to use the spatial pattern of yield to prescribe and apply variable rates of nitrogen on the field m according to the spatial pattern of yield. The method can comprise: obtaining EOS raster data that was collected on or about a DOY' during several prior crop-growing seasons; converting the EOS raster data to reflectance and NDVI; calculating NDVI* data per pixel utilizing scene statistics of the EOS raster data; extracting the NDVI* data from the EOS raster data for the field m in a form of an NDVI* map; performing the above activities of obtaining the EOS raster data on or about the DOY', converting the EOS data to reflectance and NDVI, calculating NDVI* per pixel using scene statistics utilizing scene statistics of the EOS raster data, and extracting the NDVI* data from the EOS raster data for the field m in the form of the NDVI* map for multiple years and calculating an average NDVI* map for discrete pixels across the multiple years for the field m; determining a target yield in bushels per acre for the field m for the any crop $\lambda$, for an upcoming growing season; employing public domain agronomic models to calculate an average nutrient requirement for the target yield for the field m through multiplication of a replacement in pounds per bushel for all plant nutrients consumed at harvest on the field m for the any crop $\lambda$, resulting in provisional application rates for all plant nutrients in pounds-per-acre for the field m; employing the public-domain agronomic models to determine an average nitrogen credit from a prior year for a nitrogen fixing leguminous crop k, the average nitrogen credit being subtracted from the average nitrogen requirement for the field m to yield an average nitrogen application rate; crediting the average nitrogen credit from the prior year for the nitrogen fixing leguminous crop k, the average nitrogen credit being subtracted from the average nitrogen requirement for the field m to yield a final average nitrogen application rate; combining the final average nitrogen application rate with a median NDVI* from an average pixel value for the field m; calculating a linear slope for a field m NDVI*-map-based nitrogen application guide by dividing the final average nitrogen application rate by the median NDVI*; and applying the variable rates of nitrogen across the field m with rates set by a linear relationship to the NDVI* map for each spatially discrete pixel. In these or other embodiments, the nitrogen can be applied to the field m by suitable farm equipment using API-enabled software and GPS positioning borne by the suitable farm equipment to control a rate of application at each NDVI*-bearing pixel position across the field m.

Figure 2:
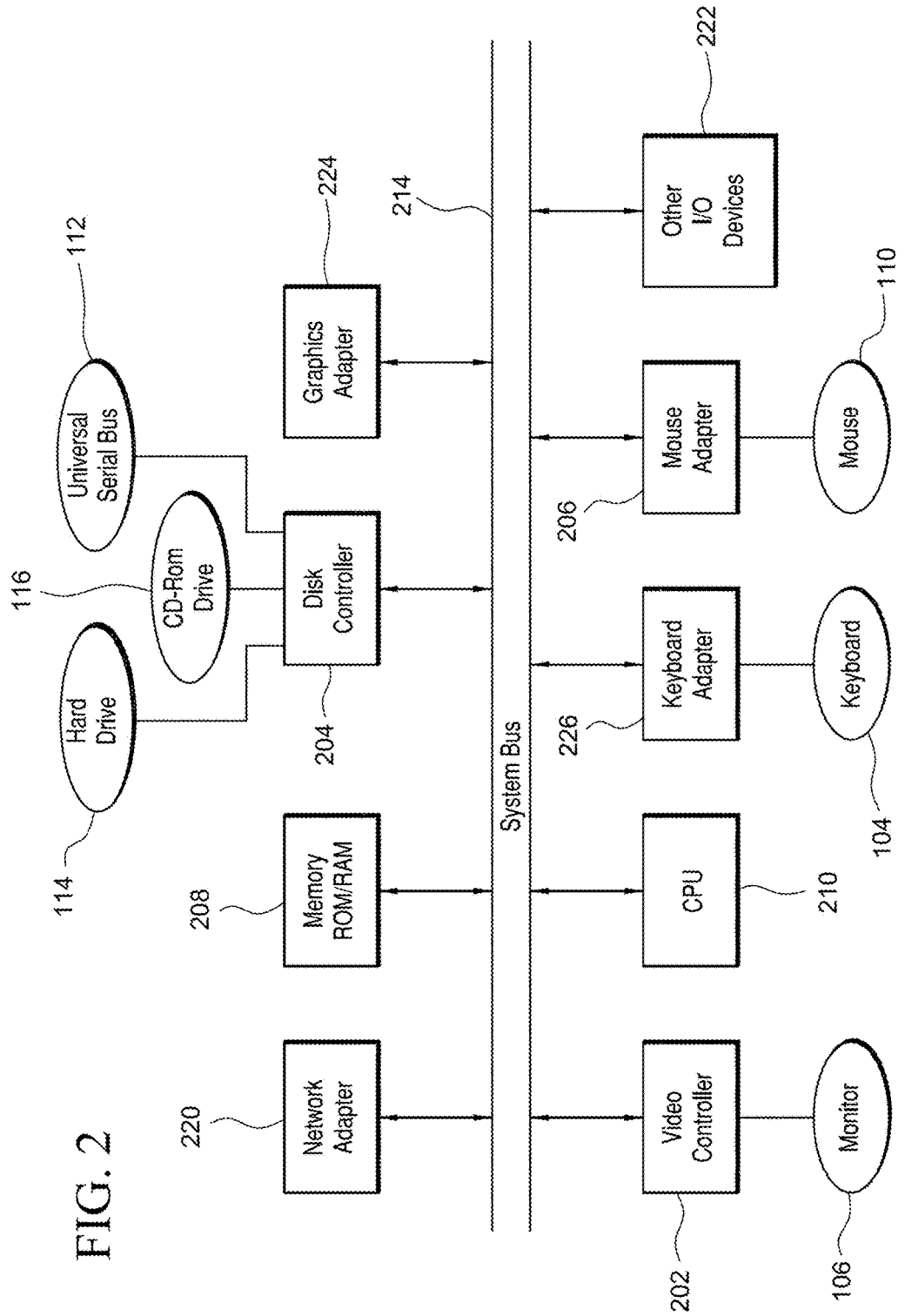
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage devices described herein. As an example, a different or separate one of a chassis 102 (and its internal components)

can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) can also be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage devices(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage device(s) refer to the portions of the memory storage device(s) that are non-volatile (e.g., non-transitory) memory.

In various examples, portions of the memory storage device(s) of the various embodiments disclosed herein (e.g., portions of the non-volatile memory storage device(s)) can be encoded with a boot code sequence suitable for restoring computer system 100 (FIG. 1) to a functional state after a system reset. In addition, portions of the memory storage device(s) of the various embodiments disclosed herein (e.g., portions of the non-volatile memory storage device(s)) can comprise microcode such as a Basic Input-Output System (BIOS) operable with computer system 100 (FIG. 1). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 2). At least a portion of the program instructions, stored on these memory storage device(s), can be suitable for carrying out at least part of the techniques and methods described herein.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
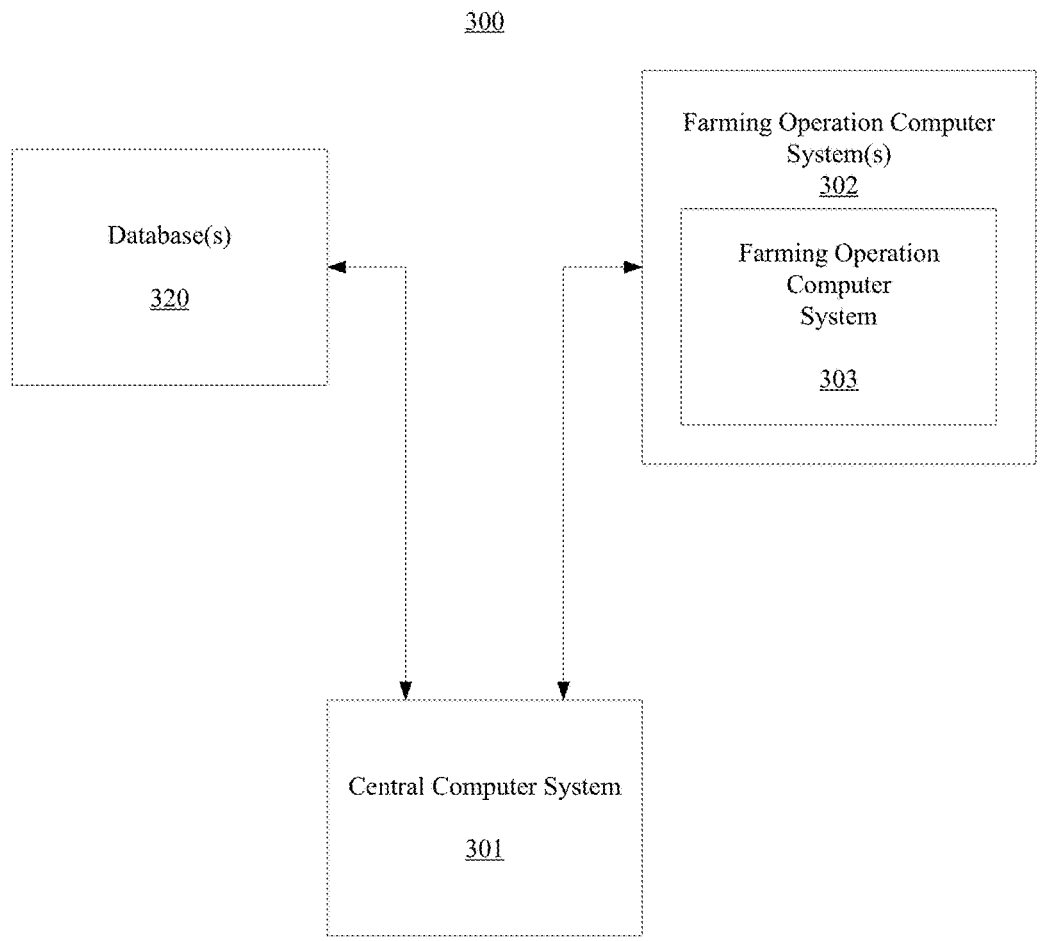
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or subsystems of system 300.

As described in greater detail below, system 300 can be operable to prescribe and deliver fertilizer over agricultural fields with discrete targeting and at variables rates by using remote sensing. In many embodiments, system 300 can apply an NDVI* to remote sensing measurements to compensate for atmospheric and/or soil background effects on NDVI. In these or other embodiments, system 300 can implement a clocking function to identify when spatial patterns of relative yield are evident on an agricultural field. In these or other embodiments, system 100 can collect and analyze remote sensing measurements from one or more antecedent years to provide a statistical representation of the spatial patterning in an agricultural field.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processors and one or more memory storage devices (e.g., one or more non-transitory memory storage devices). In these or other embodiments, the processor(s) and/or the memory storage device(s) can be similar or identical to the processor(s) and/or memory storage device(s) (e.g., non-transitory memory storage device(s)) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touch screen displays, etc.). In these or other embodiments, one or more of the input device(s) can be similar or identical to keyboard 104 (FIG. 1) and/or a mouse 110 (FIG. 1). Further, one or more of the display device(s) can be similar or identical to refreshing monitor 106 (FIG. 1) and/or screen 108 (FIG. 1). The input device(s) and the display device(s) can be coupled to the processor(s) and/or the memory storage device(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage device(s). In some embodiments, the KVM switch also can be part of central computer system 301. In a similar manner, the processor(s) and the memory storage device(s) can be local and/or remote to each other.

In many embodiments, central computer system 301 is configured to communicate with one or more farming operation computer systems 302 (e.g., a farming operation computer system 303) of one or more farming operations. For example, the farming operations can interface with central computer system 301, and vice versa, via farming operation computer system(s) 302 (e.g., farming operation computer system 303). Accordingly, in many embodiments, central computer system 301 can refer to a back end of system 300 operated by an operator and/or administrator of system 300, and farming operation computer system(s) 302 can refer to a front end of system 300 used by one or more users of system 300 (i.e., one or more farming operations). In these or other embodiments, the operator and/or administrator of system 300 can manage central computer system 301, the processor(s) of computer system 301, and/or the memory storage device(s) of computer system 301 using the input device(s) and/or display device(s) of central computer system 301. In some embodiments, system 300 can comprise farming operation computer system(s) 302 (e.g., farming operation computer system 303).

Like central computer system 301, farming operation computer system(s) 302 each can be similar or identical to computer system 100 (FIG. 1), and in many embodiments, each of farming operation computer system(s) 302 can be similar or identical to each other. At least part of central computer system 301 can be located remotely from farming operation computer system(s) 302.

Meanwhile, in many embodiments, central computer system 301 also can be configured to communicate with one or more databases 320 (e.g., one or more EOS data databases 521 (FIG. 5), one or more soil data databases 522 (FIG. 5), etc.). Database(s) 320 can be stored on one or more memory storage modules (e.g., non-transitory memory storage device(s)), which can be similar or identical to the one or more memory storage device(s) (e.g., non-transitory memory storage device(s)) described above with respect to computer system 100 (FIG. 1). Also, in some embodiments, for any particular database of database(s) 320, that particular database can be stored on a single memory storage device of the memory storage device(s) and/or the non-transitory memory storage device(s) storing database(s) 320 or it can be spread across multiple of the memory storage device(s) and/or non-transitory memory storage device(s) storing database(s) 320, depending on the size of the particular database and/or the storage capacity of the memory storage device(s) and/or non-transitory memory storage device(s).

In these or other embodiments, the memory storage device(s) of central computer system 300 can comprise some or all of the memory storage device(s) storing database(s) 320. In further embodiments, some of the memory storage device(s) storing database(s) 320 can be part of farming operation computer systems 302 and/or one or more third-party computer systems (i.e., other than central computer system 301 and farming operation computer systems 302), and in still further embodiments, all of the memory storage device(s) storing database(s) 320 can be part of farming operation computer systems 302 and/or the third-party computer system(s). Like central computer system 301 and farming operation computer system(s) 302, when applicable, each of the third-party computer system(s) can be similar or identical to computer system 100 (FIG. 1). Notably, the third-party computer systems are omitted from the drawings to better illustrate that database(s) 320 can be stored at memory storage device(s) of central computer system 301, farming operation computer system(s) 302, and/or the third-party computer systems, depending on the manner in which system 300 is implemented.

Database(s) 320 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Items) Database and IBM DB2 Database.

Meanwhile, communication between central computer system 301, farming operation computer system(s) 302 (e.g., farming operation computer system 303), and/or database(s) 320 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3, IEEE 802.11, etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/Time Division Multiple Access (TDMA)), Integrated Digital Enhanced Network (iDEN), etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.

For convenience, the functionality of system 300 is generally described herein as it relates particularly to farming operation computer system 303 and a single farming operation, but in many embodiments, the functionality of system 300 can be extended to each of farming operation computer system(s) 302 and/or to multiple farming operations. Likewise, in many embodiments, the functionality of system 300 can be extended to cover individual farming operations having multiple farming operation computer systems of farming operation computer system(s) 302.

Figure 4:
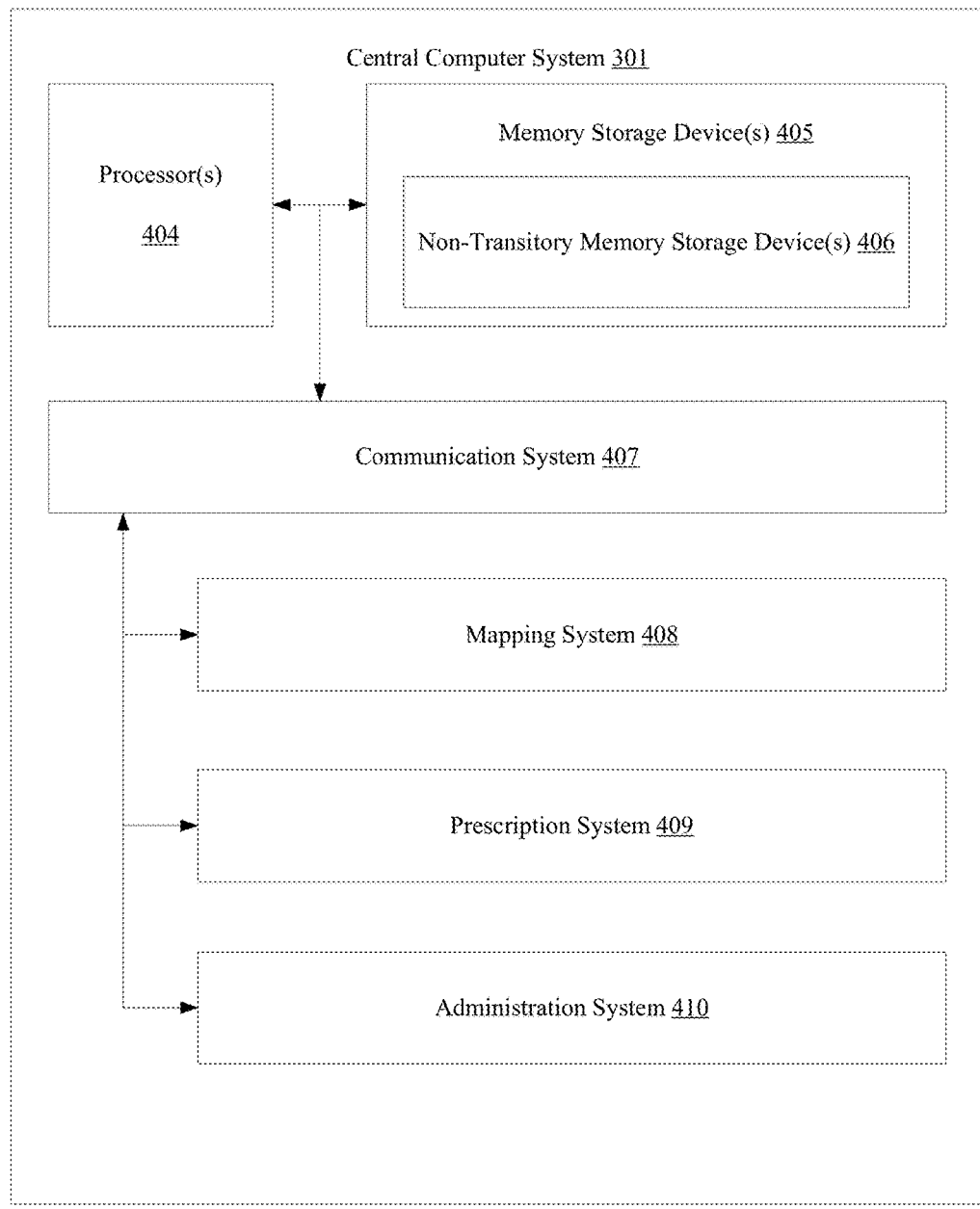
FIG. 4 illustrates a representative block diagram of the central computer system of the system of FIG. 3, according to the embodiment of FIG. 3.
Figure 5:
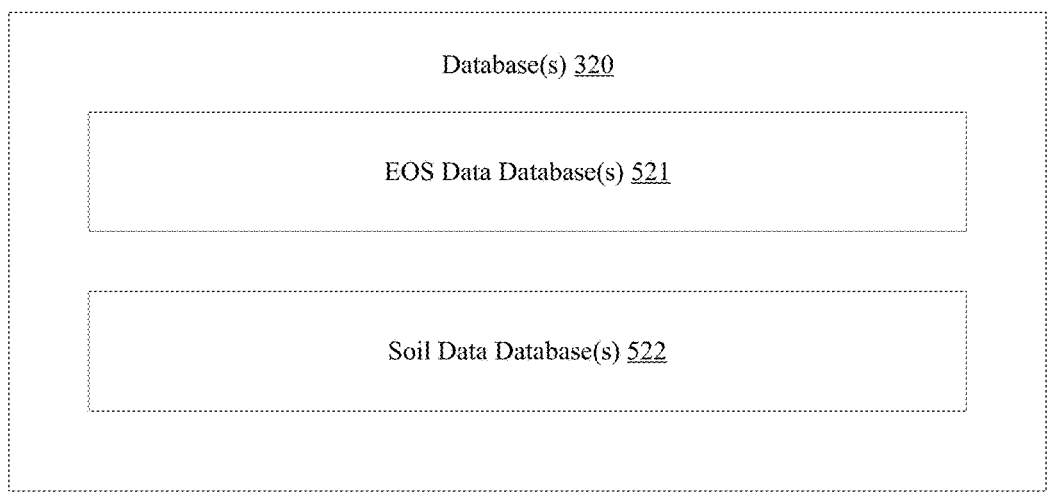
FIG. 5 illustrates a representative block diagram of one or more databases of the system of FIG. 3, according to the embodiment of FIG. 3.

Turning ahead now in the drawings, FIG. 4 illustrates a representative block diagram of central computer system 301, according to the embodiment of FIG. 3; and FIG. 5 illustrates a representative block diagram of database(s) 320, according to the embodiment of FIG. 3.

Referring first to FIG. 4, in many embodiments, central computer system 301 can comprise one or more processors 404, one or more memory storage devices 405, a communication system 407, a mapping system 408, a prescription system 409, and a administration system 410. Further, memory storage device(s) 405 can comprise non-transitory memory storage device(s) 406. In some embodiments, part or all of at least one or more of communication system 407, mapping system 408, prescription system 409, and administration system 410 can be part of at least one or more others of communication system 407, mapping system 408, prescription system 409, and administration system 410, and vice versa.

Meanwhile, referring briefly to FIG. 5, in many embodiments, database(s) 320 can comprise EOS data database(s) 521 and soil data database(s) 522. In some embodiments, part or all of at least one or more of EOS data database(s) 521 or soil data database(s) 522 can be part of the other of EOS data database(s) 521 and soil data database(s) 522, and vice versa.

Returning now to FIG. 4, in many embodiments, processor(s) 404 can be similar or identical to the processor(s) described above with respect to computer system 100 (FIG. 1) and/or central computer system 301 (FIG. 3); memory storage device(s) 405 can be similar or identical to the memory storage device(s) described above with respect to computer system 100 (FIG. 1) and/or central computer system 301 (FIG. 3); and/or non-transitory memory storage device(s) 406 can be similar or identical to the non-transitory memory storage device(s) described above with respect to computer system 100 (FIG. 1) and/or central computer system 301 (FIG. 3). Further, communication system 407, mapping system 408, prescription system 409, and administration system 410 can be implemented with hardware and/or software, as desirable. Although communication system 407, mapping system 408, prescription system 409, and administration system 410 are shown at FIG. 4 as being separate from processor(s) 404, memory storage device(s) 405, and/or non-transitory memory storage device(s) 406, in many embodiments, part or all of communication system 407, mapping system 408, prescription system 409, and administration system 410 can be stored at memory storage device(s) 405 and/or non-transitory memory storage device(s) 406 and can be called and run at processor(s) 404, such as, for example, when the part or all of communication system 407, mapping system 408, prescription system 409, and administration system 410 are implemented as software.

Communication system 407 is operable to provide and manage communication between the various elements of central computer system 301 (e.g., processor(s) 404, memory storage device(s) 405, non-transitory memory storage device(s) 406, mapping system 408, prescription system 409, administration system 410, etc.) and manage incoming and outgoing communications between central computer system 301 (FIG. 3) and farming operation computer system(s) 302 of FIG. 3 (e.g., farming operation computer system 303 (FIG. 3)) and/or database(s) 320 (FIG. 3). Like the communications between central computer system 301 (FIG. 3), farming operation computer system(s) 302 (FIG. 3), and/or database(s) 320 (FIG. 3), communication system 407 can be implemented using any suitable manner of wired and/or wireless communication, and/or using any one or any combination of wired and/or wireless communication network topologies and/or protocols, as described above with respect to the central computer system 301 (FIG. 3), farming operation computer system(s) 302 (FIG. 3), and/or database(s) 320 (FIG. 3). In many embodiments, communication system 407 can be part of hardware and/or software implemented for communications between central computer system 301 (FIG. 3), farming operation computer system(s) 302 (FIG. 3), and/or database(s) 320 (FIG. 3). For example, as applicable, communication system 407 can permit processor(s) 404 to call (i) software (e.g., at least part of mapping system 408, prescription system 409, administration system 410, etc.) stored at memory storage device(s) 405 and/or non-transitory memory storage device(s) 406, and/or (ii) data stored at memory storage device(s) 405, at non-transitory memory storage device(s) 406, and/or in database(s) 320 (FIG. 3).

In many embodiments, mapping system 408 can be operable to map a spatial pattern of yield for a crop of an agricultural field. In order to better understand how mapping system 408 operates to map a spatial pattern of yield for a crop of an agricultural field, it is first helpful to understand the roles of the NDVI* and the clocking function in determining a spatial pattern of yield for a crop of an agricultural field, as discussed below.

Soil capability can refer to an ability of soil to support a crop when soil nutrients and water are non-limiting. Soil capability is a function of hydrological, physical, and/or chemical factors of soil, which may vary across an agricultural field. Applying fertilizer to soil having low soil capability may have little to no effect on a yield for a crop grown in the soil having low soil capability. However, applying fertilizer to soil having high soil capability can improve a yield for a crop grown in the soil having high soil capability.

Despite the potentially large differences in soil capability across agricultural fields, farming operations may fertilize all areas of the agricultural fields at a same rate. Used in the context of application of fertilizer, the term "rate" can refer to a volume or weight of fertilizer per unit area. In many examples, fertilizing all areas of the agricultural fields at a same rate can result in a waste of money and often a loss of yield, especially if the agricultural fields have significant variability in soil capability.

Yield for a crop depends on a crop's health and productivity as indicated by the crop's greenness. Meanwhile, greenness of a crop depends upon a mineral nutrition and a long term water status of the crop. A relationship between exists between plant vigor and soil nutrition. The relationship of crop vigor and soil nutrition depends on physical and chemical conditions of the soil in which the crop is growing, but in general, a crop can be made healthy and productive by making available to the crop a sufficient and optimal supply of mineral nutrients in the soil as dictated by the needs of the crop and the soil capability of the soil. Maintaining adequate mineral nutrition for crops can increase crop yields.

Remotely-sensed crop greenness can be portrayed by vegetation indices that combine red and near infrared light from EOS data. Greenness can be determined using reflected red light that is inversely proportional to the green vigor of the canopy. Plants appear green because chlorophyll strongly absorbs red light in the act of photosynthesis; green is simply what is not used and is therefore reflected and visible to the human eye. Crop canopies reflect highly in the near infrared, as do many background surfaces, a common example being dry soils. However, the ratio of red versus near infrared light enables the use of vegetation indices as an estimate of plant canopy vigor. The NDVI is an exemplary vegetation index that can be applied to EOS data. The NDVI is illustrated mathematically by Equation (1) as follows:

$$NDVI = \frac{NIR - \text{Red}}{NIR + \text{Red}}, \tag{1}$$

where NIR is the near infrared reflectance and Red is the red reflectance of light for a crop.

In many examples, the NDVI may provide an inaccurate representation of the greenness of crops due to the effects of soil background reflectance and scatter and attenuation from atmospheric aerosols on the greenness measurements of the NDVI. Converting the NDVI to the NDVI* stretches the NDVI values from zero to one to represent the full range of vegetation greenness from none to saturated. Accordingly, the NDVI* can correct for the effects of soil background reflectance and scatter and attenuation from atmospheric aerosols on the greenness measurements of the NDVI.

The NDVI* is illustrated mathematically by Equation (2) as follows:

$$NDVI^* = \frac{NDVI_i - NDVI_0}{NDVI_S + NDVI_i}, \tag{2}$$

where $NDVI_i$ is a value of the NDVI for the ith pixel, $NDVI_S$ is a saturated value for the NDVI, and $NDVI_0$ is a value of NDVI for bare soil as determined using scene statistics for the area to which the NDVI values apply. The $NDVI_0$ value can be measured at the time of planting. Regarding the $NDVI_S$ value, there may be instances during a crop growing season when a maximally verdant target suitable for setting the $NDVI_S$ value will be missing in the scene statistics, such as, for example, during spring and fall when crops are becoming established or are senescing prior to harvest. Under these circumstances, the $NDVI_S$ value can be chosen as an empirical constant, since the peak value for non-cloudy scenes in an atmosphere relatively clear of aerosols occupies a range that can be determined empirically. When developed through sufficient empirical calibration, choosing a set raw NDVI value to represent the $NDVI_S$ value can enhance the accuracy of the resulting values of the NDVI*. In general, because the NDVI* is calibrated using scene statistics, the NDVI* advantageously does not require measurement of specific ground target or ground-based measurements.

The NDVI value of bare soil can be regionally variable with nearly all values greater than zero. For example, when the atmosphere contains high concentration of dust, smoke, and/or water vapor, the NDVI value of bare soil can be greater than or equal to approximately 0.2. The $NDVI_0$ value of the NDVI* corrects for this elevated soil background.

Without the soil background correction provided within NDVI*, crop response during the initial period of growth and establishment, which can be important for timing a crop's seasonal growth and maturation, cannot reliably be measured using remote sensing.

Over time and in the absence of correction to the NDVI*, rather than presenting an expected smooth growth curve, curves plotting crop growth measured using the NDVI can fluctuate in magnitude, often displaying an erroneous sawtooth pattern due to variable atmospheric aerosol content on days when the images were collected.

Meanwhile, atmospheric aerosols can scatter and/or attenuate light which can depress high values of the NDVI. Curves of crop growth measured using the NDVI* can correct for errors resulting from atmospheric aerosols. Accordingly, the NDVI* can provide relatively smooth curves of values as the crop progresses through various growth stages over a crop-growing season. Because NDVI* corrects the NDVI for the effects of both atmospheric and soil background influences, EOS data can be reliably used to perform a suite of agronomic analyses stemming from seasonal curves. For example, the phenologic stage of an agricultural field can be determined from serial snapshots of EOS data to which the NDVI* is applied.

In many examples, it is possible to determine an AED for an agricultural field by applying the NDVI* to EOS data collected through the first 45 days of a crop-growing season. Knowing when crop growth begins provides an index that permits calculating set numbers of elapsed days to predict growth stages of crops. This relationship can be calibrated for each crop type and farmed region.

For example, a clocking function can be determined using multiple snapshots of EOS data of a farmed region collected over a period of time (e.g., the initial 45 days of crop growth). Data of the EOS data corresponding to one or more agricultural fields of the farmed region can be extracted from each of the snapshots of EOS data, and the NDVI* can be applied to the extracted data. Accordingly, a suite of multiple-date NDVI* values for each of the agricultural field(s) can be accumulated for the period of time. A median NDVI* value for each of the agricultural field(s) can be determined and plotted by the DOY corresponding to the snapshots of the EOS data to yield timewise crop growth curves for the agricultural field(s). In other examples, an average NDVI* value rather than a median NDVI* value can be used. However, in many examples, a median NDVI* value provides a more robust measure of central tendency on agricultural fields.

Figure 6:
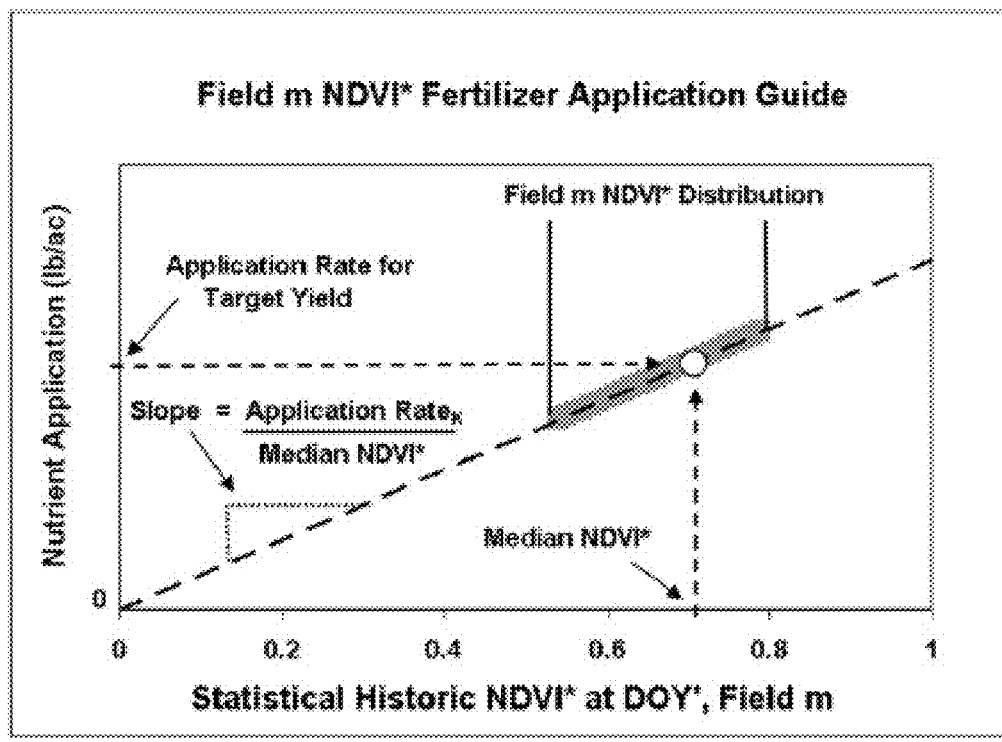
FIG. 6 illustrates an exemplary plot of a median NDVI* value for an agricultural field as a function of the DOY demonstrating a sigmoid plot curve.

The NDVI* can provide a direct expression of the chlorophyll contained in a crop canopy. Accordingly, a median NDVI* value for an agricultural field can be plotted as a function of the DOY. Like other allometric measurements of organisms (e.g., weight, length, etc.), when represented by the NDVI*, growth curves of a crop and its photosynthetic vigor can form a sigmoid or "S" shape. Through a crop-growing season, the median NDVI* value for an agricultural field can form an initial tail, followed by linear growth, followed by a growth plateau, therefore forming a somewhat S-shaped curve. FIG. 6 illustrates an exemplary plot of a median NDVI* value for an agricultural field as a function of the DOY demonstrating a sigmoid plot curve.

A linear growth phase of crops expressed according to an NDVI* value graphed as a function of the DOY can be used to determine an AED for each agricultural field. Performing a linear regression of the collected NDVI* values (as y) as a function of the DOY values (as x) can permit solving for an NDVI* value where NDVI*=0. The corresponding value of the DOY where NDVI*=0 provides an AED for the relevant agricultural field.

Knowing the AED, it is also possible to forecast the DOY for one or more (e.g., all) growth stages of a crop defined in terms of elapsed days from the AED Further, knowing the various growth stages for an agricultural field permits forecasting of when to apply fertilizer to the agricultural field for a crop. For example, corn is frequently fertilized at planting and again just before tassel formation. By calculating the AED and forecasting the growth stages, a DOY of the tasseling of corn can be predicted to permit fertilization of the corn on or around that date.

The initial tail of an NDVI* crop growth curve can be affected by water status and/or temperature. Water is generally sufficient for crops during the initial part of the crop-growing season because crop water usage and evaporation tend to be low and soil water storage tends to be high, either from irrigation or accumulation of winter and spring rain. Given sufficient water for germination and establishment of cultivated crops, the initial tail of the NDVI* crop growth curve is generally most affected by temperature, with cold temperatures delaying growth.

Conventionally, when making phenology calculations, heat units (e.g., growing degree days) can be implemented to account for the initial tail of an NDVI* crop growth curve and the role played by the growth delaying effect of low temperatures. However, using heat units can require cumbersome entry and tracking of temperature data, with mathematical calculations made from the temperature data for each agricultural field and each crop type. Using the clocking function, it is possible ignore the initial temperature-impaired tail of an NDVI* crop growth curve because the clocking function focuses on the linear portion of the NDVI* crop growth curve. The linear phase begins when the crop is no longer affected by growth-limiting temperatures. Accordingly, the clocking function permits phenology calculations to be made without the use of heat units.

NDVI* can express canopy chlorophyll content. Chlorophyll is a metabolically expensive molecule that is conserved. That is, crops do not produce excess chlorophyll. The function of chlorophyll is photosynthesis that provides a carbohydrate feedstock for the biochemical processes that create a crop's yield. The higher the rate of photosynthesis, the higher is the yield. Therefore, the magnitude of an NDVI* value can provide an indicator of relative crop photosynthesis and yield across a field for that field's soil capability. Crop vigor can be controlled by soil capability inclusive of hydrological, physical and chemical conditions—factors often influenced by topography. The spatial pattern of crop vigor over an agricultural field expressed by the NDVI* is directly linked to a soil capability of the soil of agricultural field and the yield the soil supports.

The spatial pattern of yield for a crop of an agricultural field can be demonstrated by a snapshot of EOS data that is expressed by the NDVI* and collected at a specific time during a crop-growing season (i.e., a DOY'). A DOY' can be determined for each crop of a farmed region, as described below. The relationship for DOY' is defined in terms of elapsed days from AED for a crop of an agricultural field that can be used to forecast when to collect EOS data to assess when the DOY' will occur. For example, for corn, a window for display of a spatial pattern of yield of the corn can be assessed with single snapshots of EOS data collected during a two-week window that brackets the DOY' predicted using an elapsed interval relative to the relevant AED. The single snapshots of EOS data expressed by the NDVI* can provide a surrogate measure of a relative yield for the corn, occurring in the latter period of the corn crop's growth, but well in advance of senescence and harvest.

The clocking function for various crop stages can be calibrated for each crop of a farmed region using historic data. For a particular agricultural field of a farmed region having a known type of crop, maps of EOS data for the agricultural field expressed in NDVI* can be developed.

The maps of EOS data for the agricultural field expressed in NDVI* can be compared visually to a spatial pattern of yield measured during harvest by devices of one or more harvesters that measure a flow rate or weight of a harvested crop according to geoposition provided by a global positioning system. A sufficient proportion of farming operations currently gather such data using systems that are implemented with conventional harvesting equipment. Accordingly, a DOY' for a crop of the agricultural field can be determined by analyzing the maps of EOS data for the agricultural field expressed in NDVI* to identify the DOY associated with the map of the maps that most closely corresponds to the spatial pattern of yield measured at the time of harvest. By repeating these calculations for multiple agricultural fields of the same farmed region, a statistical sampling can be developed from which to identify a number of elapsed days from AED to DOY' for any agricultural fields of the farmed region. The DOY' representing a spatial pattern of yield for corn generally occurs from 45 to 60 days prior to when the corn is ready for harvest.

Calibrating the clocking function to predict DOY' can be performed manually by human viewing of a crop's spatial pattern of yield or autonomously, such as, for example, using pattern recognition software. Implementing the maps of EOS data expressed in NDVI* with color gradients rather than gray scale gradients may provide for more accurate determination of the DOY' for the relevant crop.

Figure 11:
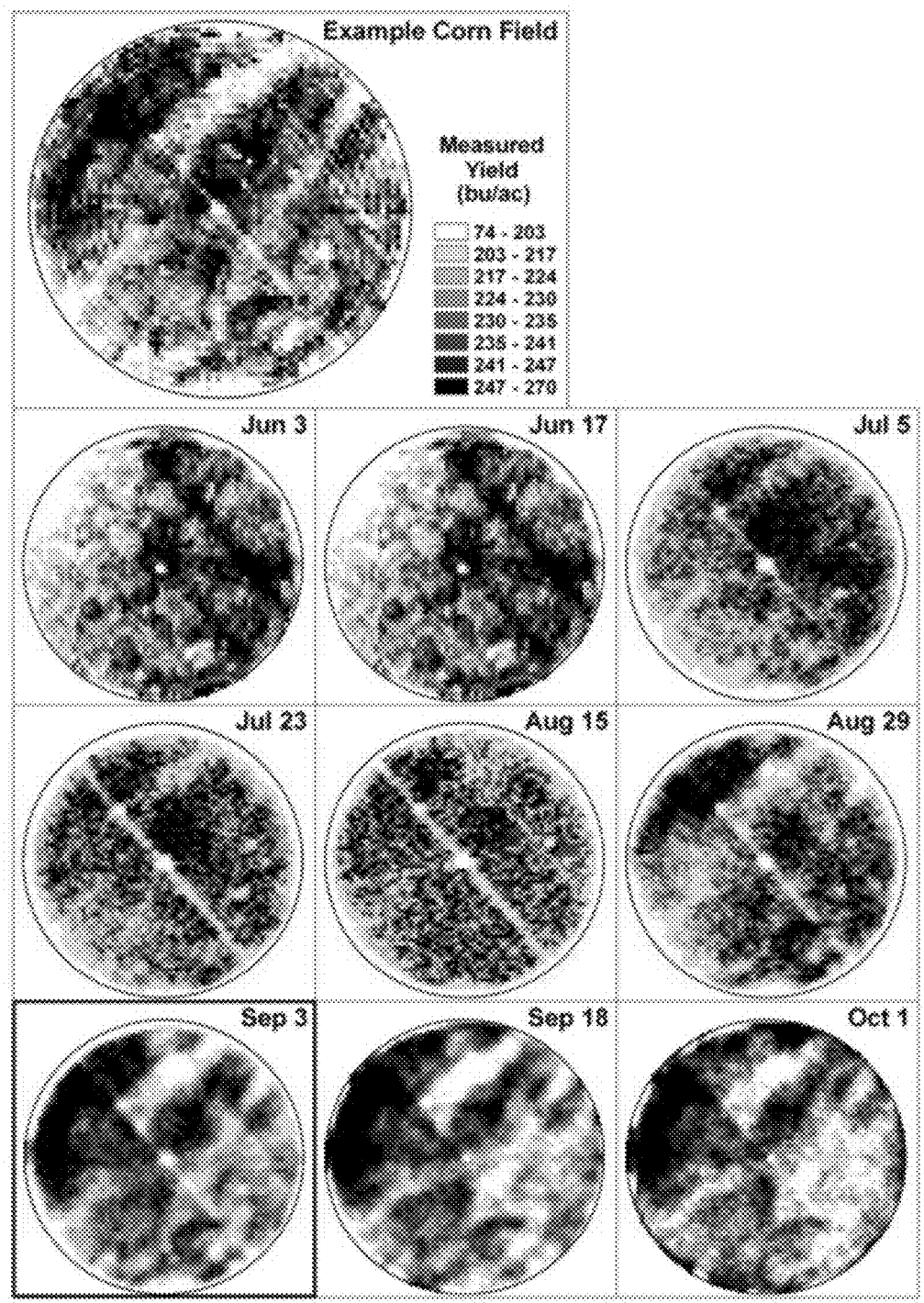
FIG. 11 illustrates a time series of maps of EOS data expressed in NDVI* for an agricultural field in which corn is being grown with a map of the measured yield of the agricultural field.

Skipping ahead in the drawings, FIG. 11 illustrates a time series of maps of EOS data expressed in NDVI* for an agricultural field in which corn is being grown with a map of the measured yield of the agricultural field. Both the measured yield and the EOS data expressed in NDVI* are portrayed as quantiles having equal numbers of samples within each bin. Quantile binning can provide greater visual contrast than percentile bins because percentile bins contain equal-sized steps regardless of the frequency each step contains. Though either binning convention can be used, quantiles may permit a more accurate calibration of the clocking function to determine DOY'. For the example, as shown at FIG. 11, a DOY' was predicted through calibration to be September 9. September 3 was the closest image available to the DOY' to express crop yield and is therefore the choice for the image to be applied to assess a spatial pattern of yield for the corn on the relevant agricultural field. The map of the measured yield of the agricultural field, labeled "Example Corn Field," was restricted to a range from about 140 to 270 bushels per acre, while ninety percent of the yield values fell within a narrower range, from 185 to 260 bushels per acre, only 28 percent of the possible distribution.

Figure 12:
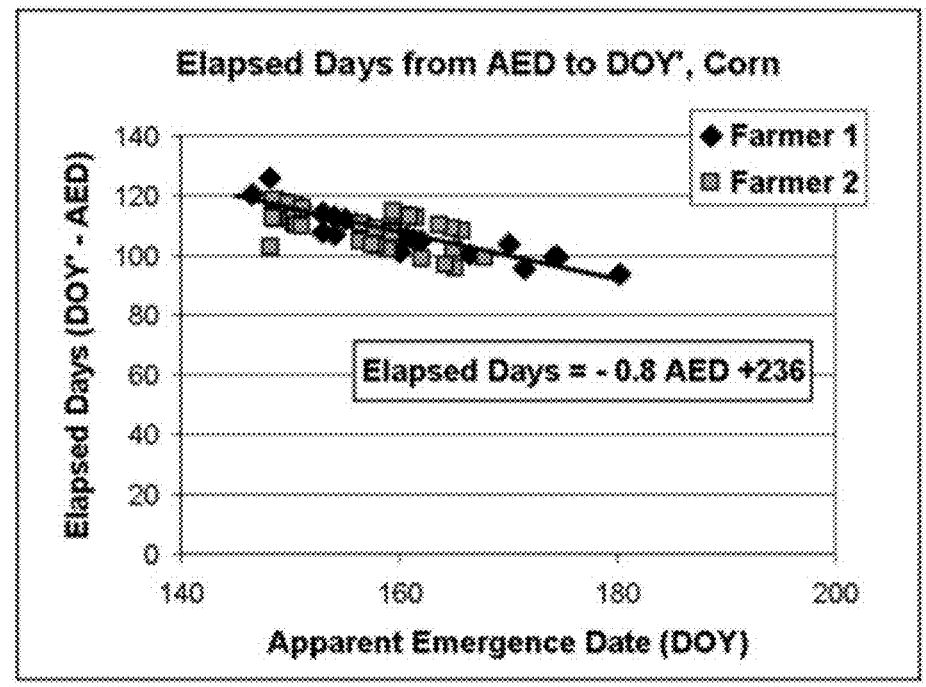
FIG. 12 illustrates a plot of elapsed days to DOY' from AED as a function of DOY for multiple agricultural fields of a farmed region.

Turning to the next drawing, FIG. 12 illustrates a plot of elapsed days to DOY' from AED as a function of DOY for multiple agricultural fields of a farmed region. By plotting the elapsed days to DOY' from AED for many agricultural fields as a function of DOY, it is possible to determine a relationship to predict elapsed days after AED for any field of a farmed region to achieve DOY'. AED timing can be highly variable, even across a given farmed region because the planting period may exceed two months. Advantageously, this relationship can forecast the elapsed days to DOY' from AED according to a particular AED. For example, for an agricultural field having a later AED (e.g., when crops are planted later in a crop-growing season) may require less elapsed time to attain DOY'.

The reduction in the elapsed period from AED to DOY' (expressed as the negative slope at FIG. 12) may results from more rapid crop development during periods of time with longer day lengths and warmer temperatures. The period for display of a spatial pattern of yield for corn occurs over about two weeks bracketing the predicted DOY'. It should be kept in mind when attempting seasonal AED calibration that the apparent scatter in the values results largely from the timing of the EOS data collected. Cloud-free EOS data availability occurs in intervals defined by the desired EOS data periodicity modified by cloud cover. Hence, for calibration of DOY', EOS data may not always be available within the ideal timing for the period bracketing DOY'. However, in practice, the clocking function used for identification of DOY' can generally overcome the potential limitation imposed by cloud cover because the spatial pattern of yield occurs across a two-week interval bracketing the DOY' and EOS data can be collected daily. After the DOY' has been determined for a farmed region, the DOY' can be used again for that crop type in future years for the agricultural fields of the farmed region.

Referring now back to FIG. 4, an average NDVI* map formed by averaging together multiple images (e.g., maps) of EOS data expressed by the NDVI* and collected at the DOY' (hereafter, also meaning within a week before or after DOY') for multiple prior crop-growing seasons can be used to scale delivery of variable fertilizer rates across an agricultural field. Historic EOS data expresses by the NDVI* and collected at the DOY' can be a surrogate measure of the spatial pattern of yield and so, can be relied upon to guide spatially-variable fertilizer prescription in a following year. The average NDVI* map can be averaged at each corresponding pixel of the multiple images (e.g., maps) of EOS data expressed by the NDVI* and collected at the DOY' for multiple prior crop-growing seasons.

Averaging together multiple images of EOS data expressed by the NDVI* and collected at the DOY' for multiple prior crop-growing seasons can provide a robust assessment of the conditions on an agricultural field. Averaging images of EOS data from more than two years may improve the accuracy of the average NDVI* map because the spatially-discrete statistical sample dampens out potential transitory affects that might have caused an agricultural field to have a poorly-performing location unrelated to that location's soil capability. In some example, to improve the average NDVI* map, radical departures of the EOS data from expected values can be detected and potentially excluded when forming the average NDVI* map. An example of EOS data that can be detected and eliminated could be EOS data corresponding to a year when a crop was incorrectly seeded with spots missed due to inattention or malfunction of the seeding equipment. Unless multiple years are used to form the average NDVI* map, such spots may not be properly fertilized. Other examples of conditions that may warrant detection and exclusion of EOS data may include storm damage, flooding or drought of the agricultural field.

In operation, mapping system 408 can determine a DOY' for a crop of an agricultural field of a farmed region using the approach for determining DOY' of an agricultural field described above. In these or other embodiments, mapping system 408 can estimate one or more prior DOY' values for a crop of an agricultural field of a farmed region for one or more prior crop-growing seasons using the approach for determining DOY' of an agricultural field described above.

In these or other embodiments, mapping system 408 can receive EOS data of an agricultural field. When mapping system 408 receive EOS data to determine a DOY', the EOS data can be collected over a period of time for a crop growing season of one or more prior crop-growing seasons. Meanwhile, when mapping system has determined the DOY' for a crop of the agricultural field, the EOS data can have been collected on or about a DOY' for the crop of the agricultural field for multiple prior crop-growing seasons. In many embodiments, mapping system 408 can receive the EOS data from EOS data database 521 (FIG. 5). In these or other embodiments, mapping system 408 can communicate with EOS data database 521 via communication system 407.

In further embodiments, mapping system 408 can convert the EOS data of the agricultural field to NDVI data. In these or other embodiments, mapping system 408 can apply the NDVI to the EOS data to convert the EOS data to NDVI data. In some embodiments, mapping system 408 can convert the EOS data to reflectance data, which can be used to provide the NDVI data. As noted above, NDVI data can be calculated from reflectance data.

In further embodiments, mapping system 408 can calculate NDVI* data from the NDVI data using scene statistics. In these or other embodiments, mapping system 408 can calculate the NDVI* data from the NDVI data using scene statistics as described above.

In many embodiments, mapping system 408 can map multiple prior crop-growing season NDVI* maps of the agricultural field from the NDVI* data. Each prior crop-growing season NDVI* map of the multiple prior crop-growing season NDVI* maps can correspond to different prior crop-growing seasons of the multiple prior crop-growing seasons. Further, mapping system 408 can map an average NDVI* map of the agricultural field by averaging corresponding pixels of the multiple prior crop-growing season NDVI* maps to form averaged pixels. The average NDVI* map can be similar or identical to the average NDVI* map described above, and the average NDVI* map can be formed by mapping system 408 as described above. In forming the average NDVI* map, mapping system 408 can map a spatial pattern of yield for a crop of an agricultural field.

Although mapping system 408 is described as receiving EOS data, converting the EOS data to the NDVI data, and converting the NDVI data to NDVI* data, in other embodiments, mapping system 408 can receive the NDVI data and/or the NDVI* data from EOS data database 521 rather than making the conversions to the NDVI data and/or NDVI* data. In these or other embodiments, the NDVI data and/or NDVI* data can be stored at EOS data database 521. In some embodiments, mapping system 408 can calculate and store the NDVI data and/or NDVI* data at EOS data database 521 for future use.

For convenience, the functionality of mapping system 408 is generally described herein as it relates particularly to one crop, one agricultural field, and one farmed region, but in many embodiments, the functionality of mapping system 408 can be extended to multiple same or different crops, multiple agricultural fields, and/or multiple farmed regions.

Meanwhile, prescription system 409 can be operable to prescribe spatially-variable application rates of one or more nutrients (e.g., nitrogen) for the agricultural field. As explained below, prescription system 409 can use the average NDVI* map formed by mapping system 408 to help determine how to prescribe spatially-variable application rates of the nutrient(s) (e.g., nitrogen) for the agricultural field. Accordingly, prescription system 409 can communicate with mapping system 408 to receive the average NDVI* map via communication system 407.

In many embodiments, prescription system 409 can seek to scale the amount of nutrient(s) applied to an agricultural field to the expected yield, thereby conserving fertilizer, saving input cost, and enhancing yield. This scaling can be made on the basis of the replacement of nutrients that are removed from the agricultural field at harvest.

Table 1 provides an exemplary summary of nutrients removed from an agricultural field per bushel for corn and corresponding nutrient replacement rates.

TABLE 1

| Nutrient | Grain (lb/bu) | Stover (lb/bu) | Total (lb/bu) |
| --- | --- | --- | --- |
| N | 0.8000 | 0.3400 | 1.1400 |
| P | 0.1667 | 0.0407 | 0.2073 |
| K | 0.2467 | 0.8333 | 1.0800 |
| Ca | 0.0067 | 0.1933 | 0.2000 |
| Mg | 0.0533 | 0.1400 | 0.1933 |
| S | 0.0600 | 0.0467 | 0.1067 |
| Z | 0.0007 | 0.0010 | 0.0017 |
| B | 0.0002 | 0.0007 | 0.0009 |
| Mn | 0.0005 | 0.0022 | 0.0027 |
| Fe | 0.0004 | 0.0073 | 0.0077 |
| Cu | 0.0001 | 0.0006 | 0.0007 |

Tables like Table 1 are readily available for virtually all crops. The replacement values for the various nutrients vary by crop and can be updated from published scientific literature representing the latest research.

In some embodiments, prescription system 409 can reference tables like Table 1 to determine nutrient replacement rates for crops. Prescription system 409 can use the most up-to-date values for nutrient replacement while taking into account regional nutrient trends supplied by the soil. However, in other embodiments, prescription system 409 can use crop specific models to determine nutrient replacement rates for crops, especially for nitrogen, as described below. In these embodiments, the crop specific models can provide refinements of replacement rates like the replacement rates of Table 1. Accordingly, calculating crop specific models to determine nutrient replacement rates may provide more accurate replacement rates for a particular crop of an agricultural field.

The nutrient replacement rates for a crop (shown in the right-most column of Table 1) is the removed weight of the nutrients in pounds for each bushel harvested. Because these factors are scaled to the harvested weight, a priori, these factors can be scaled to a target yield.

Knowing a crop and a target yield, it is possible to calculate an amount of a replacement nutrient for each nutrient needed by a crop. The average replacement rate for a crop of an agricultural field with respect to a particular nutrient can be determined using Equation (3) as follows:

$$\text{Average Replacement Rate} = \text{Target Yield} * \text{Replacement}, \quad (3)$$

where the Target Yield is specified for the agricultural field based upon historic performance of the agricultural field or, if unknown, in consideration of expected performance given the farmed region having the agricultural field and the soil type of the agricultural field. Meanwhile, Replacement is specified as the nutrient replacement rate for the crop for the particular nutrient.

In many examples, Equation 3 and/or Table 1 ignore the components of nutrients that results from residue that remains on an agricultural field. For example, as discussed further below, nitrogen components resulting from such residue can be significant. Such residue has become increasingly common due to no-till farming. The component of supply from residue depends on a number of factors including wind transport from the exposed field into hedge rows and adjoining fields and pastures and also the rate of decomposition of the residue that requires precipitation. Because of the complexity involved in determining whether nutrients from residue decomposition will be available to a succeeding crop, residue contribution to the succeeding crop can be calculated using public domain agronomic models, as discussed in further detail below.

All the nutrients of the crop tables like Table 1 can be provided proportionally. Fertilizer is commonly mixed into a blend that contains the correct proportion of nutrients to meet the target yield. Referencing the average NDVI* map as a surrogate measure of the spatial pattern of yield, it is possible to determine the level of nutrients needed through the agricultural field, where higher or lower yield proportionately requires higher or lower levels of nutrients. Accordingly, application of a fertilizer blend that is scaled to the spatial pattern of yield of the average NDVI* map can provide a precision amount of nutrients throughout the different areas of the agricultural field.

Calculating the level of nitrogen needed for a target yield can be more complex than calculating the levels of non-nitrogen nutrients for the target yield, because nitrogen is lost from fertilizer by volatization, bacterial-induced denitrification, and leaching and because nitrogen residue remaining from a previous crop may be substantial. However, unlike nitrogen, other nutrients do not suffer from loss by volatization, bacterial-induced denitrification, and leaching. Further, replacement of non-nitrogen nutrients causes negligible buildup in soil because the quantities supplied are removed each crop-growing season by the crop and so, this approach can be sustainable over many years. As a result, when assessing requirements of non-nitrogen nutrients, it may be sufficient to simply multiply the target yield (in bu/ac) by the replacement rates provided in the right-most column of crop tables like Table 1, in accordance with Equation 3. Moreover, this approach can be reliably used to provide non-nitrogen nutrients to an agricultural field when soil sampling data is unavailable. Nonetheless, in the event that timely soil sample data is available, the soil sample data can be entered into calculations within agronomic models similarly to as described below for nitrogen to provide a more accurate final fertilizer blend and average application rates in pounds per acre.

As noted, unlike non-nitrogen nutrient fertilization, nitrogen fertilization for crops can be more complex than simply multiplying the yield by a nitrogen replacement rate provided by a crop table like Table 1. Accordingly, in many examples, Equation (3) may be insufficient to determine the nitrogen fertilization needs of a crop. The amount of nitrogen lost by fertilizer due to volatization, bacterial-induced denitrification, and leaching can be predicted given soil temperature and moisture because processes of volatization, bacterial-induced denitrification, and leaching are controlled by temperature and water availability. Meanwhile, generally known factors governing nitrogen losses from cropped soils may include: (i) wet conditions lead to leaching losses, (ii) coarse textured (sandy) soils enhance the potential for leaching, (iii) fine textured (clayey) soils have reduced potential for leaching, (iv) warm and dry conditions enhance volatization losses, (v) warm and wet conditions enhance biological activity and, therefore, denitrification, (vi) higher soil organic matter supports higher biological activity and produces higher yields, and (vii) higher organic matter content supports greater levels of denitrification.

Accordingly, excess nitrogen in soil can be determined and offset against the quantity of nitrogen to be provided to a crop. For example, prior-season legume crops leave excess nitrogen in the soil as a result of nitrogen fixation and therefore a nitrogen credit can be subtracted from the required nitrogen to calculate applied nitrogen. Nitrogen credits can be provided as an average value for an agricultural field. Meanwhile, nitrogen losses can be added to the quantity of nitrogen to be provided to a crop.

Table 2 lists exemplary nitrogen credits from prior legume crops.

TABLE 2

| Crop | Stand Cover (%) | Sandy Soil (lb/ac) | Other Soils (lb/ac) |
| --- | --- | --- | --- |
| Alfalfa | >70 | 120 | 170 |
|  | 30-70 | 90 | 140 |
|  | <30 | 40 | 110 |
| Red Clover | >70 | 80 | 95 |
| or Birdsfoot | 30-70 | 50 | 70 |
| Trefoil | <30 | 30 | 45 |
| Soybeans | — | 0 | 40 |

Nitrogen credits depend upon crop species and can be determined by EOS data for the previous year. In many examples, because soil texture and organic content can influence nitrogen fixation levels, prescription system 409 can reference soil database 522 (FIG. 5) to obtain soil data as discussed in greater detail below. Soil database 522 (FIG. 5) can store soil data collected from the SSURGO-USDA Soil Survey Geographic Database. The process of noting the crop to be grown, whether the prior crop was a legume, determining the soil texture, and then determining the nitrogen credit to be applied is well known in the field of agriculture. In many example, due to yearly changes in the nitrogen content of soil, the nitrogen credit may only be valid for one following year.

Returning again to FIG. 4, prescription system 409 can use Equation (4) to calculate the Average Nitrogen Replacement Rate for an agricultural field. Equation (4) is provided here:

Average Nitrogen Replacement Rate=Target Yield Nitrogen Replacement−Nitrogen Credit+Nitrogen Loss    (4)

To solve for Equation (4), the Target Yield Nitrogen Replacement Rate can be calculated by solving Equation (3) for nitrogen. Meanwhile, any applicable Nitrogen Credit can be subtracted and/or any applicable Nitrogen Loss of the soil can be added to the Target Yield Nitrogen Replacement Rate to arrive upon the Average Nitrogen Replacement Rate.

Accordingly, the Average Nitrogen Replacement Rate of Equation (4) provides an estimate of what nitrogen a crop will need to attain the target yield, factoring for nitrogen credits and losses. In many embodiments, the inputs of Equation 4 can be assessed and set through public domain agronomic models as described below. As indicated above, although Equation (4), as provided, is tailored to nitrogen, comparable variants of Equation (4) can also be used for other nutrients where it makes sense to factor similar credits and losses of the nutrient.

Calculation of nitrogen crop fertilization can be complex because of the linkages between temperature, rainfall, soil water, and temperature of both air and soil. In order to calculate the average nitrogen fertilizer application to be made on an agricultural field, prescription system 409 can use public domain agronomic models can be employed that provide the mathematical linkages for Equation 4 and for the seven factors of nitrogen loss of soil discussed above. The mathematical relationships contained within the agronomic models are supported by a large body of relevant scientific literature that is widely understood in the field of agronomy. These models are public domain tools that can greatly benefit agriculture, however, they are virtually never used conventionally by average farming operations due to lack of familiarity, training and experience. However, the public domain agronomic models are a ready tool to calculate the target yield replacement rates for a crop using the most current nutrient rates developed in the scientific literature, calculate a nitrogen credit if appropriate, and calculate a nitrogen loss of soil given the expected weather during the growing season.

Any suitable public domain agronomic models can be used by prescription system 409 to assess nutrient (e.g., nitrogen) credits and losses. In many embodiments, exemplary public domain agronomic models that can be used to assess nutrient credits and losses are described by Jones, J. W. Jones et al., "DSSAT Cropping System Model," European Journal of Agronomy 18:235-265 (2003) and the Agricultural Production Systems Simulator described by R. McCown et al., "Apsim—an Agricultural Production System Simulation-Model for Operational-Research. Mathematics and Computers," Simulation 39, pp. 225-231 (1995). For example, exemplary public domain agronomic models can include the CERES-Maize Plant Growth Model, CROPGRO Grain Legumes Plant Growth Model, and the CENTURY SOM residue model. Like the legume nitrogen credit, these residue model can provide for calculating nitrogen credits that can be subtracted from the fertilizer to be applied to an agricultural field.

Meanwhile, in order to assess a loss of nitrogen resulting from the seven factors provided above affecting nitrogen loss from cropped soil, expected weather through the crop-growing season, including temperature and expected rainfall can be entered. Expected weather can be provided as a statistically-based average for weather records for the farmed region as modified by long-term weather forecasts for the crop-growing season of the farmed region in which the agricultural field resides. Point data of weather stations with known geoposition can be converted to rasters that interpolate rainfall and temperature over the scale of farmed regions. To create a raster from point data, geostatistical methods such as kriging result in a file of continuously varying values across the land surface that, in application, can be significantly more accurate than using data from the nearest weather station. The temperature and precipitation rasters can then be combined with soil data provided by soil data database 522 (FIG. 5). The geoposition of each agricultural field can be located in the form of a shapefile outline that can be used to clip out data relating to the agricultural field of interest from rasters corresponding to farmed regions.

Temperature, infiltration and soil water can vary spatially and serve to govern the rate of soil nitrogen loss. This lost nitrogen can be added to the replacement nitrogen in order to supply the nitrogen to reach the target yield of the agricultural field. Public domain agronomic models can be adapted to run nitrogen loss calculations across entire farmed regions through the use of raster inputs. The resulting fate of soil nitrogen continually varies according to soil properties and the expected precipitation and temperature. Computer simulations by the public domain agronomic models using spatially varying inputs of soil data provided by soil data database 522 (FIG. 5) and statistics for expected temperature and precipitation can simulate the potential average nitrogen loss for any agricultural field. The shapefile that defines the outline of each agricultural field can then be used to clip out and calculate the average predicted nitrogen loss for that agricultural field.

The estimated amount of nitrogen loss by an agricultural field can be refined according to the fertilizer compound and timing for fertilizer application, some potentially volatizing more readily than others, and some undergoing denitrification and leaching more readily than others. Examples of nitrogen fertilizer compounds include ammonium nitrate, potassium nitrate, anhydrous ammonia, etc. Nitrogen loss can be adjusted for the particular type of fertilizer and when it is applied on the field. Such adjustments can be made such that an input of the compound and timing of nitrogen fertilizer can result in an enhanced estimate of nitrogen loss. In some embodiments, a farming operation can communicate with prescription system 409 (e.g., via communication system 407 and using farming operation computer system 303 FIG. 3) to specify the type of nitrogen fertilizer and its application timing as well as cost per weight for each type. In further embodiments, prescription system 409 can be configured to specify optimal application of nitrogen both by timing and by type of fertilizer to minimize loss or minimize cost as evaluated by the public domain agronomic models.

In some embodiments, a farming operation can communicate with prescription system 409 (e.g., via communication system 407 and using farming operation computer system 303 FIG. 3) to provide measured soil data from the agricultural field (rather than relying on soil data from soil data database 522 (FIG. 5)) to be used in the public domain agronomic models for adjusting the nutrient content of the fertilizer. In some soils, sufficient content of non-nitrogen nutrients may be available to justify crediting non-nitrogen nutrients in a similar manner to nitrogen. An example can be potassium, which is often so abundant in western soils that little or no additional potassium need be added through fertilization.

Prescription system 409 can also use the public domain agronomic models to assess the nutrient needs for leguminous crops that may not need to be provided with replacement nitrogen because such crops fix nitrogen. In these examples, the fertilizer will simply be replacement rates for the non-nitrogen nutrients that are used by the leguminous crop with no additional nitrogen since the legumes can fix the nitrogen needed to pass through their life cycles. However, in some examples, heavy yields of legume crops can be coaxed by adding relatively low rates of nitrogen, despite nitrogen fixing of the legume crops, that can be provided and scaled to the agricultural field in accordance with the average NDVI* map. In many embodiments, for the fertilization of legume crops, non-nitrogen nutrients can simply be calculated according to Equation 3 and referencing crop tables like Table 1, while additional nitrogen fertilization can be skipped entirely.

In many embodiments, prescription system 409 can specify both nitrogen and non-nitrogen nutrients as a blend to provide the correct proportion of each nutrient for the target yield, such as, for example, using the application rate(s) of each nutrient calculated to determine the relevant proportions. The resulting blended fertilizer can then be metered onto the relevant agricultural field as determined by the average NDVI* map.

Figure 13:
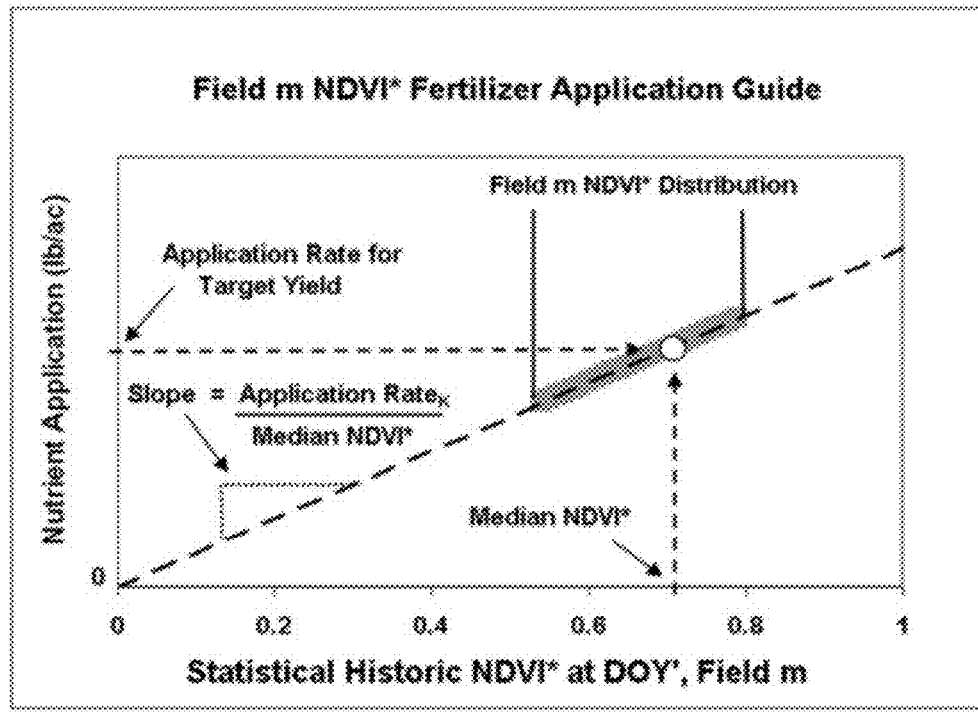
FIG. 13 plots an exemplary nutrient application rate as a function of the values of an average NDVI* map of an agricultural field.

Further, prescription system 409 can scale each nutrient for a crop of an agricultural field to guide fertilizer application using a single blended fertilizer to be provided at varying rates. For example, turning ahead in the drawings, FIG. 13 plots an exemplary nutrient application rate as a function of the values of an average NDVI* map of an agricultural field. Plotting the nutrient application rate as a function of the average NDVI* map of an agricultural field and combining that information with the average NDVI* map can provide an average NDVI* map-based nutrient application guide from which prescription system 409 can scale each nutrient for a crop of an agricultural field to guide fertilizer application using a single blended fertilizer to be provided at varying rates.

Prior to performing the scaling, prescription system 409 (FIG. 4) can calculate the non-nitrogen and nitrogen nutrient needs of a crop to meet the target yield for the crop on an agricultural field. Referencing FIG. 13, the fertilizer to meet the target yield is indicated as a point within the average NDVI* map. A linear relationship for fertilizer application is established by the average yield and the median NDVI* value of the average NDVI* map for the agricultural field. FIG. 13 is proportionally correct for the fertilizer blend and for each individual nutrient, the only change being the scale in pounds per acre.

The rates of all nutrients for the agricultural field can be fixed and proportional within the fertilizer blend, so one blend correctly expresses the proportional rates to be applied to meet the target yield but at differential rates of application across the agricultural field established by the statistical representation of the average NDVI* map at each pixel location. The average application rate is the target yield in pounds per acre of fertilizer blend represented by the point on FIG. 13. The application rate can be increased if the NDVI* value is higher than the median NDVI* value for the agricultural field or decreased if the NDVI* value is less than the median NDVI* value for the agricultural field.

An example blend that contains 0.6 lb of nitrogen will contain a 0.4 lb of the non-nitrogen nutrients in the blend. If, for example, the nitrogen proportion required to reach the target yield is 150 lbs per acre, then the average amount of the blend to be applied to the agricultural field can be 150 lbs/ac/0.6=250 lb/ac. The application of this blend is made on an agricultural field according to the relationship in Equation 5, a linear relationship that governs the application according to the NDVI* value of each pixel of the NDVI* map of the agricultural field. Equation 5 is provided here:

$$\text{Application Rate}_i = NDVI_i^* * \frac{\text{Average Nutrient Blend Rate}}{\text{Median } NDVI^*}, \quad (5)$$

where i represents the ith pixel of the average NDVI* map of the agricultural field and the Average Nutrient Blend Rate is the average application rate of the blended fertilizer made proportionally from the one or more nutrients to be applied to the agricultural field.

Figure 14:
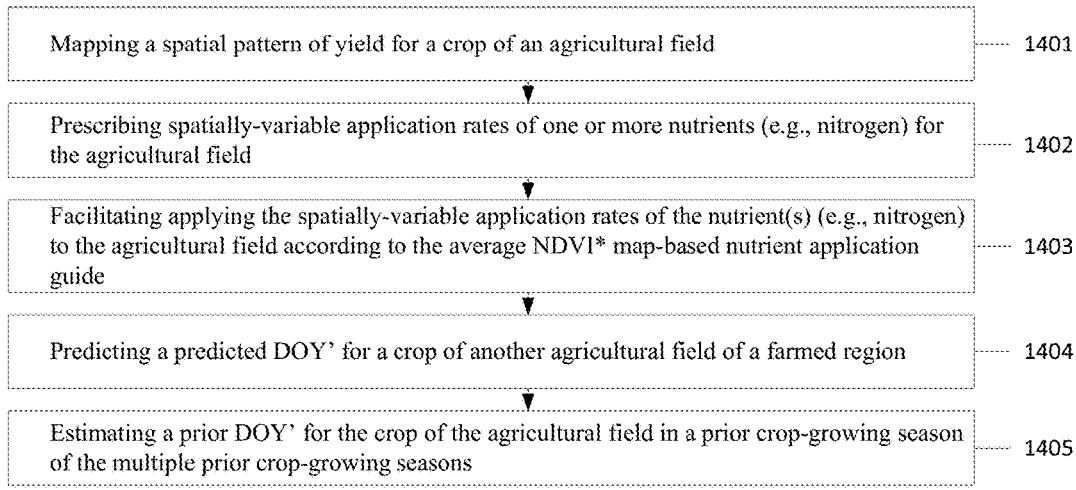
FIG. 14 illustrates a flow chart for an embodiment of a method 1400.

The linear relationship shown by FIG. 13 can be established from two known points. One of these points is theoretically the origin since zero nutrients are needed by zero crop cover. Staying with the same example, the fertilizer application line is defined as 250 lb/ac divided by the median NDVI* value for the average NDVI* map of the agricultural field (i.e., 0.71), yielding a slope of 352 lb/ac. Applying Equation (50, for any ith pixel of the average NDVI* map of the agricultural field, the Application Rate$_i$ at that ith pixel is given by the product of NDVI*$_i$*352 lb/ac. Referring to FIG. 14, the least application at the low end of the distribution of the average NDVI* map (i.e., 0.53), requires an application rate of 187 lb/ac; at the high end of the distribution (i.e., 0.8), the application rate is 282 lb/ac. For this fairly typical example, the 95 lb/ac range of application represents 38% of the range relative to the average application rate of 250 lb/ac. Note, however, that this example is for the weight of the nutrient and does not take into account the other molecules present in the various compounds for each nutrient in the fertilizer blend, so the actual weight applied will be much greater. Two common examples of fertilizer weight are diphosphorous dioxide ($P_2O_2$) whose weight is 2.3 times that of phosphorous alone, and potassium oxide ($K_2O$) that is 1.2 times the weight of potassium alone.

Referring again back to FIG. 4, in many embodiments, administration system 410 can facilitate applying the spatially-variable application rates of the nutrient(s) (e.g., nitrogen) to the agricultural field according to the average NDVI* map-based nutrient application guide. For example, the NDVI* value for every pixel of the average NDVI* map of the agricultural field has known geoposition that can guide variable rate application of the fertilizer blend across agricultural field by equipment outfitted with global positioning systems and rate controlling devices. Accordingly, in some embodiments, administration system 410 can communicate the slope provided by Equation 5 and the average NDVI* map to a farming operation, together forming an average NDVI* map-based nutrient application guide. Further, administration system 410 can provide the farming operation with an amount of fertilizer to be purchased, specified by a number of acres covering the field multiplied by average application per acre. For example, discounting the fertilizer weight that includes non-nutrient molecules, if an agricultural field is 100 acres, then the average application rate of 250 lb/ac would yield an application of 25,000 lb of the fertilizer blend. Again, these data are the weight of the actual nutrients required by the crop. Including the weight of non-nutrient molecules could add approximately 50% more weight, hence the actual fertilizer weight could be 50,000 lb. The weight of the various fertilizers used in the blend are highly variable, however, it is possible to calculate the unit weight of the blend to be applied on the field. In many embodiments, administration system 410 can make this calculation and provide it to the farming operation. In these or other embodiments, administration system 410 can communicate information (e.g., the average NDVI* map-based nutrient application guide, the amount of fertilizer to be purchased, etc.) to the farming operation at farming operation computer system 303 (FIG. 3) via communication system 407.

Farming operations frequently fertilize their crop twice during the growing season, at planting and then again at tasseling. Such fertilization is often made with different compounds of nitrogen. For example, a starter application at planting may use one nitrogen fertilizer while later applications may be made with other nitrogenous compounds. The proportionality for assessing the weight of various fertilizer blends can be factored according to the type of fertilizer being used.

In many embodiments, administration system 410 can provide the average NDVI* map-based nutrient application guide to the farming operation as raster data. The farmer can use the raster data to control fertilizer application systems (e.g., center pivots, boom sprayers, tractor-based fertilizer application systems, etc.) to apply fertilizer to the agricultural field in line with the average NDVI* map-based nutrient application guide. In many embodiments, the fertilizer application systems can implement global positioning systems and software configured to interpret the raster data and the nutrient application rates to apply fertilizer to the agricultural field in line with the average NDVI* map-based nutrient application guide.

Notably, although administration system 410 is generally described as merely communicating information to the farming operation to then be used by the farming operation, in many embodiments, administration system 410 can remotely control the fertilizer application systems of a farming operation in line with the average NDVI* map-based nutrient application guide. In these or other embodiments, one or more of farming operation computer system(s) 302 of FIG. 3 (e.g., farming operation computer system 303 (FIG. 3)) can be integrated with one or more fertilizer application systems.

In some embodiments, by reference to stored NDVI* maps of agricultural fields and other related information, administration system 410 can calculate the potential return on investment and make recommendation regarding avoiding planting, treating or irrigating areas of agricultural fields that may repeatedly fail to provide a return. Assessment on potential return on investment can be made with only limited data on the cost of inputs to attain a crop, for example fertilizer, soil ameliorants, diesel and general wear and tear on the farm equipment performing the planting. Such data can be stored at EOS data database 521 (FIG. 5) for each farmed region and updated automatically. Accordingly, administration module 410 can provide options to a farming operation to avoid planting crops in certain areas of agricultural fields, such as, for example, areas having high potential for negative return on investment. Likewise, administration system 410 forecast yields and return on investment. Further, administration system 410 can provide the farmer with a map for where to concentrate further effort for sampling, analysis and potential ameliorative treatments to enhance yields on portions of an agricultural field where yield continually lags behind the general yield trend on that agricultural field.

Although the functionality of system 300 is generally described with rates provided in units of pounds per bushel and with target yields described in units of pounds per acre, in other embodiments, the functionality of system 300 can be extended to any suitable unit measurements for rate, target yield, etc. For example, rates can be expressed using any suitable units of weight per weight, and target yield can be expressed using any suitable units of weight per area.

Turning ahead in the drawings, FIGS. 7-10 illustrate process flows for performing various activities performed by and/or relating to system 300 (FIG. 3), mapping system 408 (FIG. 4), prescription system 409 (FIG. 4), and/or administration system 410 (FIG. 4). With respect to FIGS. 7-9, (i) $\lambda$, can refer to the crop type, (ii) i can refer to the ith pixel of EOS data, (iii) j can refer to the jth day, which for EOS data, is the day of the overpass, (iv) k can refer to the kth nutrient, (v) m can refer to the mth agricultural field, and (vi) n can refer to numbers of samples.

Figure 7:
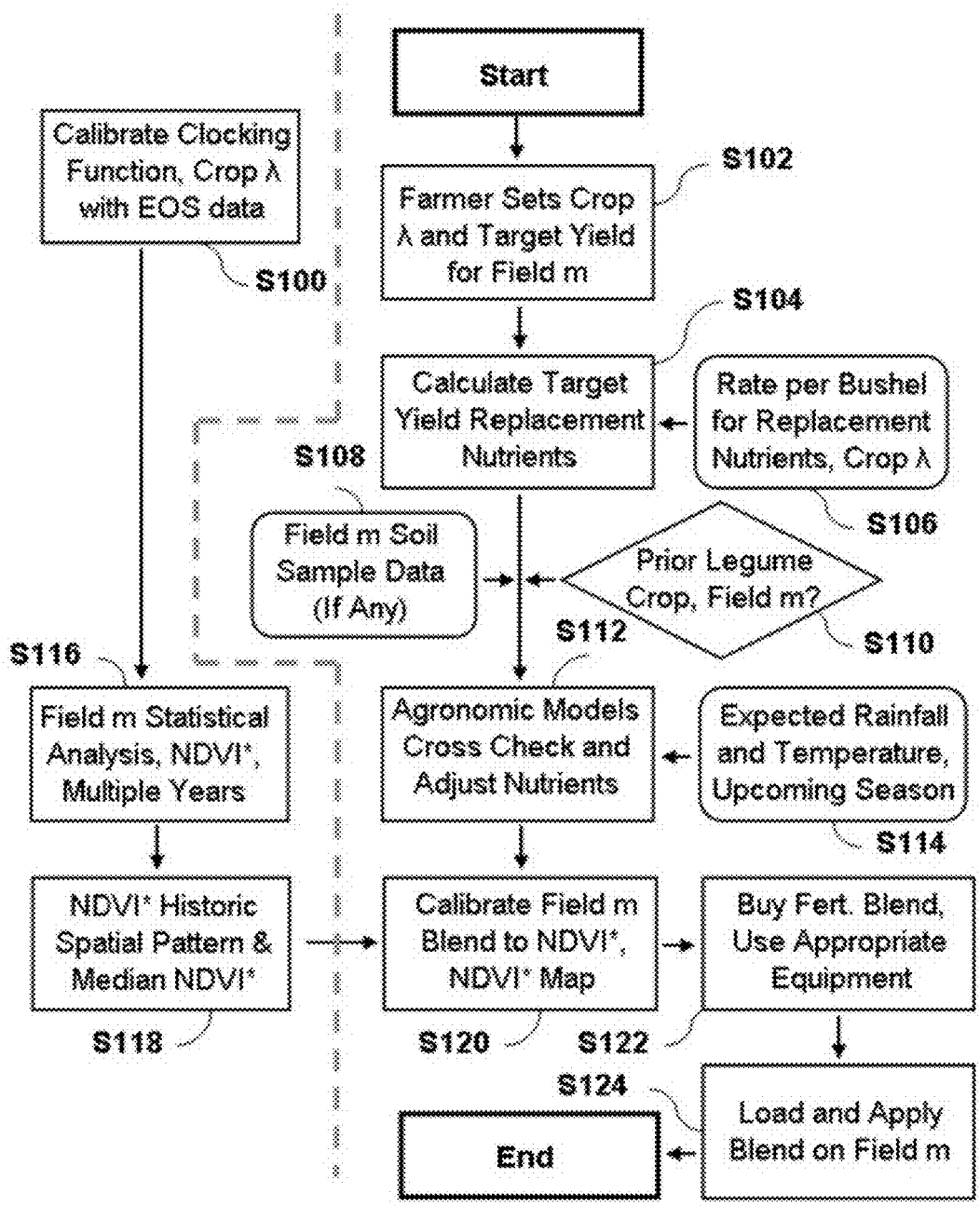
FIG. 7 illustrates a high level exemplary process flow of the exemplary processes illustrated at FIGS. 8-10.
Figure 8:
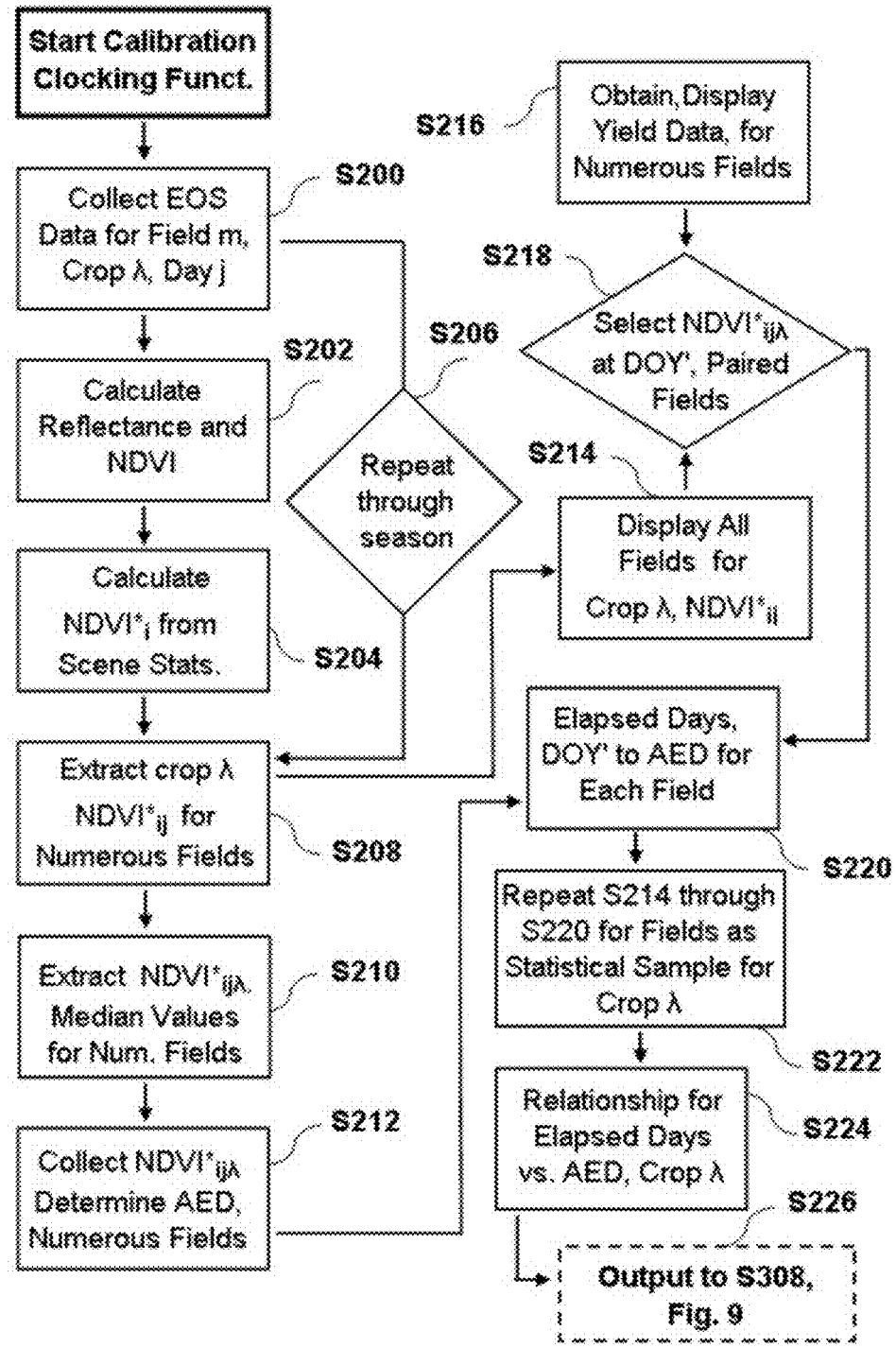
FIG. 8 illustrates an exemplary process flow for calibrating a clocking function for the desired crop k.
Figure 9:
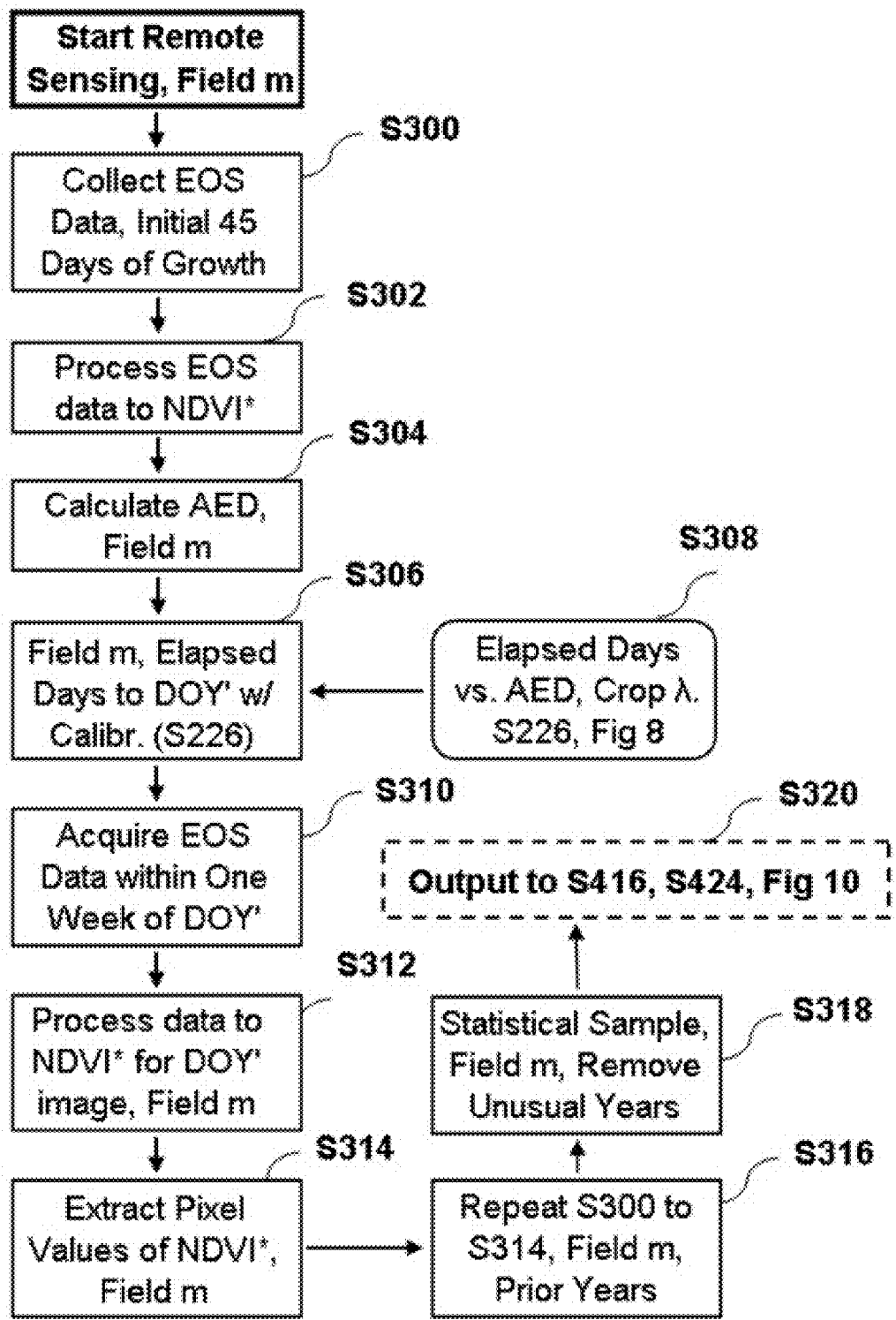
FIG. 9 illustrates an exemplary process flow for remote sensing analysis for operational use on agricultural field m.
Figure 10:
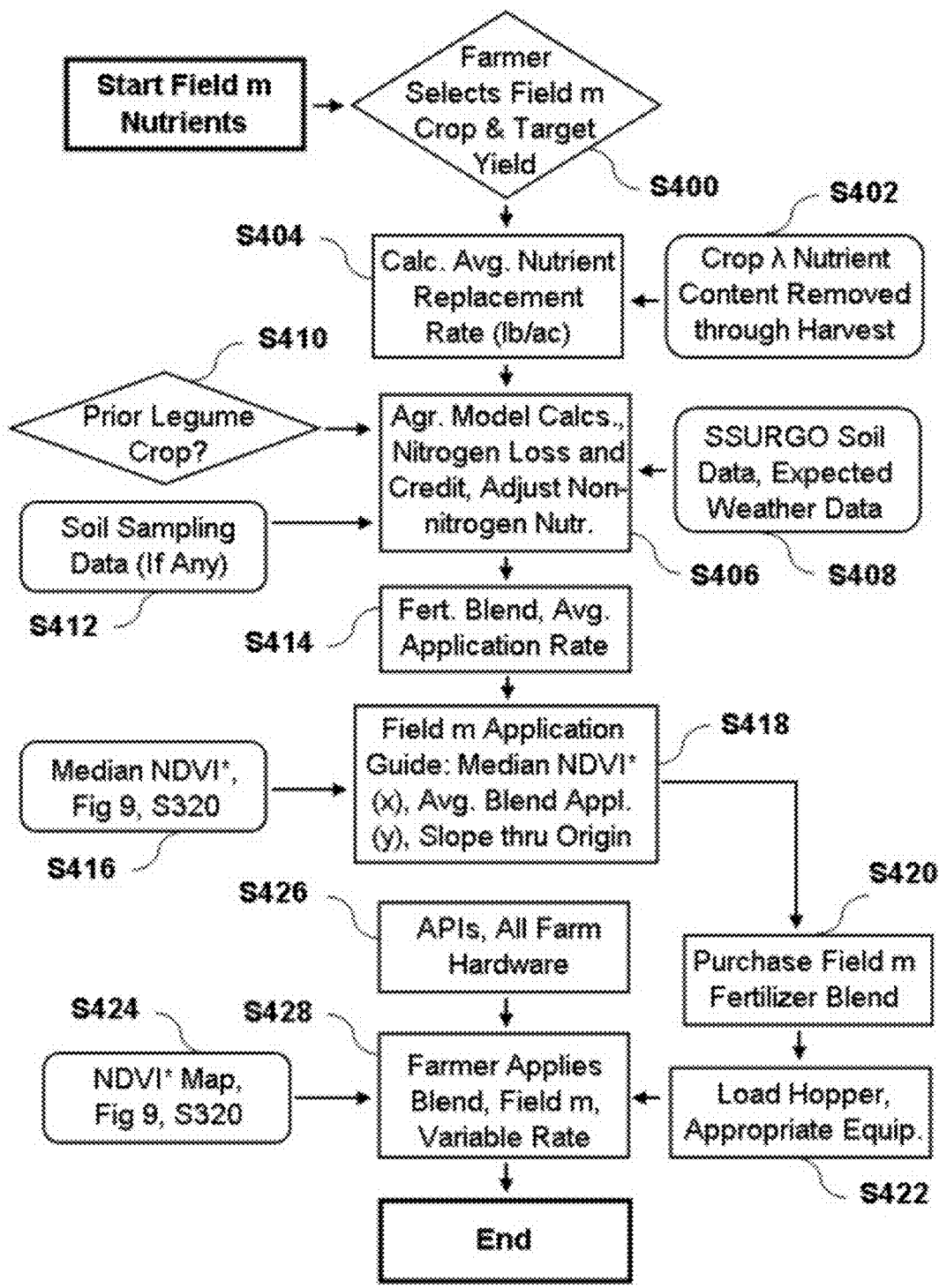
FIG. 10 illustrates an exemplary process flow for determining nutrient application rates of a fertilizer blend for agricultural field m.

FIG. 7 illustrates a high level exemplary process flow of the exemplary processes illustrated at FIGS. 8-10. Starting at activity S100, a clocking function can be calibrated for crop $\lambda$ using EOS data. Generally, activities S100, S116, and S118 can be performed before performing activities S102, S104, S106, S108, S110, S112, S114, S120, S122, and S124. Remote sensing inputs are shown along the left side of the flowchart in S100, S116 and S118. Activities S102, S104, S106, S108, S110, S112, S114, S120, S122, and S124 can be directed to determining and applying the fertilizer prescription.

Returning to activity S102, a farming operation of agricultural field m can select a crop type and estimate a target average yield (for example, as bushels per acre) based upon past experience to be attainable and reasonable but also relatively high. Moving to activity S104, nutrients can be assessed to replace nutrients lost through growth and harvest of the target yield given weight of nutrients per bushel of crop $\lambda$. Input for any recent soil sample results can be input at activity S108 and whether a legume crop was grown on agricultural field m can be determined at activity S110. These pieces of information can provide correction for nitrogen and non-nitrogen nutrients to be placed on agricultural field m using calculations in public domain agronomic models in activity S112 with input of expected rainfall and temperature at activity S114.

Moving to activity S116, remote sensing analysis can be conducted for agricultural field m to determine when DOY' occurred during multiple prior years. The EOS data expressed as NDVI* at DOY' obtained for multiple years results in an average NDVI* map and a median NDVI* value for agricultural field m (activity S118). The raster for agricultural field m created at activity S116 can be passed to activity S120 for calibrating the blend of nutrients and their average application rate per acre from activity S112 for application onto agricultural field m according to the average NDVI* map. Fertilizer can be purchased at activity S122, loaded onto farm equipment with appropriate capability for variable metering of fertilizer according to geoposition measured by global positioning system and applied onto agricultural field m in activity S124.

Turning to the next drawing, FIG. 8 illustrates an exemplary process flow for calibrating a clocking function for the desired crop $\lambda$. EOS data can be collected for all jth days and stored at activity S200. Images of EOS data can be collected about one week apart through the initial period of crop establishment for calibrating the clocking function for each crop type $\lambda$. These images of EOS data can be converted to reflectance and NDVI at activity S202. At activity S204, NDVI scene statistics can be extracted from the EOS data and an NDVI* can be calculated for all pixels of the images of the EOS data based upon the scene statistics. Activity S206 can designate that EOS data are continually gathered and processed throughout the growing season. Accordingly, activity S206 can be regarded as a decision block of the process flow in recognition that image collection requires decision for when and how often images will be needed.

Moving to activity S208, NDVI* pixel data for a specific crop type $\lambda$ for numerous fields can be extracted and a statistical representation of this sample can be chosen, for example, the field median NDVI* value of activity S210. Median values can be more robust indicators of field trends than averages and so are used in calculations here, however, averages can also work well in most cases. Field medians are collected together to represent a crop's growth through the season at activity S212 and subjected to the graphing approach described above with respect to FIG. 6 to determine each agricultural field m's AED.

Returning to activity S208, the process flow also moves to activities S214, S216, and S218 where visual displays of the NDVI* values across agricultural field m (activity S214) are compared to a map display of yield across agricultural field m measured at the time of harvest (activity S216). At the decision block of S218, the image date of the EOS data expressed as NDVI* of activity S214 that best matches the measured spatial expression of yield of S216 is chosen through visual comparison to approximate DOY'.

Returning to activity S214, the AED value determined for agricultural field m moves to activity S220 where the AED date (as DOY) is subtracted from the selected approximate DOY' date of the displayed image to arrive at an estimate of elapsed days from AED to DOY'. Activity S222 calls for repeating steps from S214, S216, S218, and S220 to create a statistical sample for a calibration relationship of elapsed days versus AED. These pooled values are then fitted with a linear relationship to estimate the elapsed days from AED according to each field's AED using regression in activity S224, an example of which is illustrated at FIG. 11. The calibration steps that passed from activity S208 through activity S224 can be repeated for each crop type λ, within a farmed region. The mathematical relationship from activity S224 for each crop type λ can then be output from activity S226 to activity S308 (FIG. 9) for use in forecasting when the spatial-yield pattern, at DOY', will occur for one or more agricultural fields.

Turning to the next drawings, FIG. 9 illustrates an exemplary process flow for remote sensing analysis for operational use on agricultural field m. At activity S300, EOS data can be collected during the linear phase of EOS data expressed as NDVI* for each agricultural field m. The linear growth phase data can be converted to EOS data expressed as NDVI* at activity S302, a process that encompasses the individual steps contained within activities S200, S202, and S204 of FIG. 8. At activity S304, the NDVI* values within the linear growth phase for crop type λ can be treated to the linear regression calibration procedure of the clocking function, as described above with respect to FIG. 6, to estimate AED for agricultural field m growing crop type λ. The relationship for the number of elapsed days for displaying the spatial-yield pattern (DOY') that passed from calibration at activity S226 (FIG. 8) is used at activity S308 to estimate when the spatial-yield pattern will be displayed by agricultural field m. At activity S312, the image of EOS data to represent the DOY' is acquired for agricultural field m, converted to be expressed as NDVI* data and in activity S314 the NDVI* pixel values are extracted.

Activity S316 specifies that activities S300 through S314 can be repeated for prior year crop cover in order to assemble an average NDVI* map that is robust and free from transient and non-representative patterns. Such crop problems may arise through drought, storms, flooding etc. requiring that years with these problems are excluded when forming the average NDVI* map at activity S318. At activity S320, the flowchart provides output to two locations, as a median NDVI* value for agricultural field m (activity S416) and as an average NDVI* map (activity S424).

Turning to the next drawing, FIG. 10 illustrates an exemplary process flow for determining nutrient application rates of a fertilizer blend for agricultural field m. Beginning with activity S400, a farming operation can select the crop type and target yield. Moving to activity S404, an algorithm can calculate the replacement of the nutrients that are harvested from agricultural field m specified as rates in activity S402, which can be calculated using public domain agronomic models. At activity S406, public domain agronomic models can be used to calculate nitrogen losses and credits and adjust non-nitrogen nutrients according to (i) inputs of soil conditions and expected weather from activity S408, (ii) whether a prior legume crop provided a nitrogen credit (activity S410), and (iii) soil sampling results, if any are available (activity S412). Although soil sampling and analysis are potentially valuable to enhance the ultimate fertilizer blend, activity S412 can be omitted. Output from activity S406 can result in a fertilizer blend and an average application rate in pounds per acre at activity S414.

Activity S416 can provide the median NDVI* value measured for the average NDVI* map at S320 (FIG. 9). The median NDVI* value can be combined at activity S418 with an average application rate from activity S414 following as described above with respect to FIG. 13. Knowing the average application rate can permit a farming operation to calculate the total amount of the fertilizer blend for agricultural field m that can then be purchased at activity S420. The blend can be loaded into the hopper of appropriate equipment that contains a global positioning system and that is configured to meter the flow of the fertilizer onto the agricultural field m at the rate specified. At activity S428, the farming operation can then apply the fertilizer blend at variable application rates onto agricultural field m with software driven by an API (application program interface) appropriate for the type of equipment used (activity S426) according to the equipment's geoposition measured by the global position system and at rates determined by pixel values in the average NDVI* map (activity S424).

Turning ahead in the drawings, FIG. 14 illustrates a flow chart for an embodiment of a method 1400. Method 1400 is merely exemplary and is not limited to the embodiments presented herein. Method 1400 can be employed in many different embodiments or examples not specifically depicted or described herein. In some embodiments, the activities of method 1400 can be performed in the order presented. In other embodiments, the activities of method 1400 can be performed in any other suitable order. In still other embodiments, one or more of the activities in method 1400 can be combined or skipped.

Figure 15:
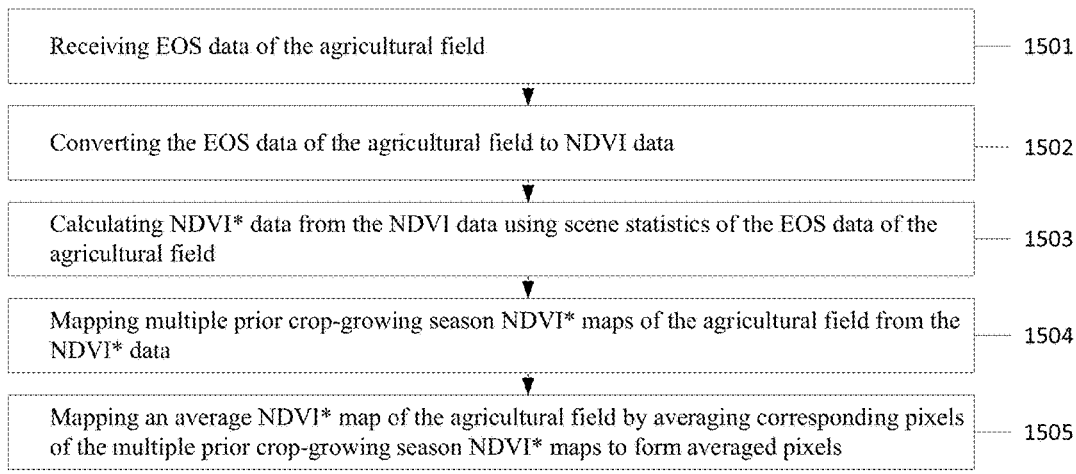
FIG. 15 illustrates an exemplary activity of mapping a spatial pattern of yield for a crop of an agricultural field, according to the embodiment of FIG. 14.

In many embodiments, method 1400 can comprise activity 1401 of mapping a spatial pattern of yield for a crop of an agricultural field. In many embodiments, the spatial pattern of yield can be similar or identical to the spatial pattern of yield described above with respect to system 300 (FIG. 3) and/or mapping system 408 (FIG. 4); the crop can be similar or identical to the crop described above with respect to system 300 (FIG. 3) and/or mapping system 408 (FIG. 4); and/or the agricultural field can be similar or identical to the agricultural field described above with respect to system 300 (FIG. 3) and/or mapping system 408 (FIG. 4). In these or other embodiments, performing activity 1401 can be similar or identical to mapping a spatial pattern of yield for a crop of an agricultural field as described above with respect to system 300 (FIG. 3) and/or mapping system 408 (FIG. 4). FIG. 15 illustrates an exemplary activity 1401, according to the embodiment of FIG. 14.

For example, activity 1401 can comprise activity 1501 of receiving EOS data of the agricultural field. In many embodiments, the EOS data can be similar or identical to the EOS data described above with respect to system 300 (FIG. 3) and/or mapping system 408 (FIG. 4). Further, performing activity 1501 can be similar or identical to receiving EOS data of the agricultural field as described above with respect to system 300 (FIG. 3) and/or mapping system 408 (FIG. 4).

In some embodiments, activity 1401 can comprise activity 1502 of converting the EOS data of the agricultural field to NDVI data. In many embodiments, the NDVI data can be similar or identical to the NDVI data described above with respect to system 300 (FIG. 3) and/or mapping system 408

(FIG. 4). Further, performing activity 1502 can be similar or identical to converting the EOS data of the agricultural field to NDVI data as described above with respect to system 300 (FIG. 3) and/or mapping system 408 (FIG. 4). Accordingly, in some embodiments, activity 1502 can comprise an activity of converting the EOS data to reflectance data, and/or an activity of converting the reflectance data to the NDVI data.

In some embodiments, activity 1401 can comprise activity 1503 of calculating NDVI* data from the NDVI data using scene statistics of the EOS data of the agricultural field. In many embodiments, the NDVI* data can be similar or identical to the NDVI* data described above with respect to system 300 (FIG. 3) and/or mapping system 408 (FIG. 4). Further, performing activity 1503 can be similar or identical to calculating NDVI* data from the NDVI data using scene statistics of the EOS data of the agricultural field as described above with respect to system 300 (FIG. 3) and/or mapping system 408 (FIG. 4).

In many embodiments, activity 1401 can comprise activity 1504 of mapping multiple prior crop-growing season NDVI* maps of the agricultural field from the NDVI* data. In many embodiments, the multiple prior crop-growing season NDVI* maps of the agricultural field can be similar or identical to the multiple prior crop-growing season NDVI* maps of the agricultural field described above with respect to system 300 (FIG. 3) and/or mapping system 408 (FIG. 4). Further, performing activity 1504 can be similar or identical to mapping multiple prior crop-growing season NDVI* maps of the agricultural field from the NDVI* data as described above with respect to system 300 (FIG. 3) and/or mapping system 408 (FIG. 4).

In many embodiments, activity 1401 can comprise activity 1505 of mapping an average NDVI* map of the agricultural field by averaging corresponding pixels of the multiple prior crop-growing season NDVI* maps to form averaged pixels. In many embodiments, the average NDVI* map can be similar or identical to the average NDVI* map described above with respect to system 300 (FIG. 3) and/or mapping system 408 (FIG. 4). Further, performing activity 1505 can be similar or identical to mapping an average NDVI* map of the agricultural field by averaging corresponding pixels of the multiple prior crop-growing season NDVI* maps to form averaged pixels as described above with respect to system 300 (FIG. 3) and/or mapping system 408 (FIG. 4). FIG. 16 illustrates an exemplary activity 1505, according to the embodiment of FIG. 14.

For example, activity 1505 can comprise activity 1601 of identifying at least one prior crop-growing season NDVI* map of the multiple prior crop-growing season NDVI* maps comprising aberrant NDVI* data of the NDVI* data. In many embodiments, the prior crop-growing season NDVI* map(s) of the multiple prior crop-growing season NDVI* maps comprising aberrant NDVI* data can be similar or identical to the prior crop-growing season NDVI* map(s) of the multiple prior crop-growing season NDVI* maps comprising aberrant NDVI* data described above with respect to system 300 (FIG. 3) and/or mapping system 408 (FIG. 4). Further, performing activity 1601 can be similar or identical to identifying at least one prior crop-growing season NDVI* map of the multiple prior crop-growing season NDVI* maps comprising aberrant NDVI* data of the NDVI* data as described above with respect to system 300 (FIG. 3) and/or mapping system 408 (FIG. 4).

Further, activity 1505 can comprise activity 1602 of 1402. In these embodiments, performing activity 1602 can be similar or identical to excluding the prior crop-growing season NDVI* map(s) of the multiple prior crop-growing season NDVI* maps when averaging the corresponding pixels of the multiple prior crop-growing season NDVI* maps to form the averaged pixels of the average NDVI* map as described above with respect to system 300 (FIG. 3) and/or mapping system 408 (FIG. 4).

Returning now back to FIG. 14, in many embodiments, method 1400 can comprise activity 1402 of prescribing spatially-variable application rates of one or more nutrients (e.g., nitrogen) for the agricultural field. In various embodiments, performing activity 1402 can be similar or identical to prescribing spatially-variable application rates of nutrients (e.g., nitrogen) for the agricultural field as described above with respect to system 300 (FIG. 3) and/or prescription system 409 (FIG. 4). FIG. 17 illustrates an exemplary activity 1402, according to the embodiment of FIG. 14.

For example, activity 1402 can comprise activity 1701 of determining a target yield for the crop of the agricultural field for an upcoming crop-growing season. In many embodiments, the target yield can be similar or identical to the target yield described above with respect to system 300 (FIG. 3) and/or prescription system 409 (FIG. 4). Further, performing activity 1701 can be similar or identical to determining a target yield for the crop of the agricultural field for an upcoming crop-growing season as described above with respect to system 300 (FIG. 3) and/or prescription system 409 (FIG. 4).

In some embodiments, activity 1402 can comprise activity 1702 of calculating a provisional average nutrient (e.g., nitrogen) application rate for the target yield for the crop of the agricultural field. In many embodiments, the provisional average nutrient application rate can be similar or identical to the target yield nitrogen replacement rate described above with respect to system 300 (FIG. 3) and/or prescription system 409 (FIG. 4). Further, performing activity 1702 can be similar or identical to calculating a provisional average nutrient (e.g., nitrogen) application rate for the target yield for the crop of the agricultural field as described above with respect to system 300 (FIG. 3) and/or prescription system 409 (FIG. 4).

In some embodiments, activity 1402 can comprise activity 1703 of determining an average nutrient (e.g., nitrogen) credit of the crop of the agricultural field for a prior crop-growing season of the multiple prior crop-growing seasons. In many embodiments, the average nutrient (e.g., nitrogen) credit of the crop of the agricultural field can be similar or identical to the average nutrient (e.g., nitrogen) credit of the crop of the agricultural field described above with respect to system 300 (FIG. 3) and/or prescription system 409 (FIG. 4). Further, performing activity 1703 can be similar or identical to determining an average nutrient (e.g., nitrogen) credit of the crop of the agricultural field for a prior crop-growing season of the multiple prior crop-growing seasons as described above with respect to system 300 (FIG. 3) and/or prescription system 409 (FIG. 4).

In some embodiments, activity 1402 can comprise activity 1704 of determining an average nitrogen loss of the soil of the agricultural field. In many embodiments, the average nitrogen loss of the soil of the agricultural field can be similar or identical to the average nitrogen loss of the soil of the agricultural field of the agricultural field described above with respect to system 300 (FIG. 3) and/or prescription system 409 (FIG. 4). Further, performing activity 1704 can be similar or identical to determining an average nitrogen loss of the soil of the agricultural field as described above with respect to system 300 (FIG. 3) and/or prescription system 409 (FIG. 4). In some embodiments, activity 1704 can be omitted.

In some embodiments, activity 1402 can comprise activity 1705 of calculating a final average nutrient (e.g., nitrogen) application rate for the target yield for the crop of agricultural field. In many embodiments, activity 1705 can comprise an activity of subtracting the average nutrient (e.g., nitrogen) credit from the provisional average nutrient (e.g., nitrogen) application rate. In further embodiments, when determining a final average nitrogen application rate, activity 1705 can comprise an activity of adding the average nitrogen loss of the soil of the agricultural field to the provisional average nitrogen application rate. Further, performing activity 1705 can be similar or identical to calculating a final average nutrient (e.g., nitrogen) application rate for the target yield for the crop of agricultural field as described above with respect to system 300 (FIG. 3) and/or prescription system 409 (FIG. 4).

In some embodiments, activity 1402 can comprise activity 1706 of calculating a linear slope for an average NDVI* map-based nutrient application guide by dividing the final average nutrient (e.g., nitrogen) application rate by a median NDVI* value of the averaged pixels of the average NDVI* map. In many embodiments, the average NDVI* map-based nutrient application guide can be similar or identical to the average NDVI* map-based nutrient application guide described above with respect to system 300 (FIG. 3) and/or prescription system 409 (FIG. 4). In these or other embodiments, performing activity 1706 can be similar or identical to calculating a linear slope for an average NDVI* map-based nutrient application guide by dividing the final average nutrient (e.g., nitrogen) application rate by a median NDVI* value of the averaged pixels of the average NDVI* map as described above with respect to system 300 (FIG. 3) and/or prescription system 409 (FIG. 4).

In many embodiments, one or more of activities 1702-1705 can be performed one or more times for different nutrients, such as, for example, as described above with respect to system 300 (FIG. 3) or prescription system 409 (FIG. 4).

Turning now back to FIG. 14, method 1400 can comprise activity 1403 of facilitating applying the spatially-variable application rates of the nutrient(s) (e.g., nitrogen) to the agricultural field according to the average NDVI* map-based nutrient application guide. In many embodiments, performing activity 1706 can be similar or identical to facilitating applying the spatially-variable application rates of nitrogen to the agricultural field according to the average NDVI* map-based nutrient application guide as described above with respect to system 300 (FIG. 3) and/or administration system 410 (FIG. 4). FIG. 18 illustrates an exemplary activity 1403, according to the embodiment of FIG. 14.

For example, in some embodiments, activity 1403 can comprise activity 1801 of (i) identifying with a global positioning system a position of farm equipment at the agricultural field, the farm equipment being configured to apply the nutrient(s) (e.g., nitrogen) to the agricultural field, and (ii) associating the position of the farm equipment with a related pixel of the averaged pixels of the average NDVI* map of the agricultural field to determine a rate of the nutrient(s) (e.g., nitrogen) to be applied to the agricultural field by the farm equipment. In many embodiments, performing activity 1801 can be similar or identical to (i) identifying with a global positioning system a position of farm equipment at the agricultural field, the farm equipment being configured to apply the nutrient(s) (e.g., nitrogen) to the agricultural field, and (ii) associating the position of the farm equipment with a related pixel of the averaged pixels of the average NDVI* map of the agricultural field to determine a rate of the nutrient(s) (e.g., nitrogen) to be applied to the agricultural field by the farm equipment as described above with respect to system 300 (FIG. 3) and/or administration system 410 (FIG. 4).

In other embodiments, activity 1403 can comprise activity 1802 of communicating the average NDVI* map-based nutrient application guide to a farming operation. In many embodiments, performing activity 1802 can be similar or identical to communicating the average NDVI* map-based nutrient application guide to a farming operation as described above with respect to system 300 (FIG. 3) and/or administration system 410 (FIG. 4). In some embodiments, when activity 1802 is performed, activity 1801 can be omitted, and vice versa.

Returning again to FIG. 14, in some embodiments, method 1400 can comprise activity 1404 of predicting a predicted DOY' for a crop of another agricultural field of a farmed region. In many embodiments, performing activity 1404 can be similar or identical to predicting a predicted DOY' for a crop of another agricultural field of a farmed region as described above with respect to system 300 (FIG. 3) and/or mapping system 408 (FIG. 4). In some embodiments, activity 1404 can be performed as part of activity 1401.

In further embodiments, method 1400 can comprise activity 1405 of estimating a prior DOY' for the crop of the agricultural field in a prior crop-growing season of the multiple prior crop-growing seasons. In many embodiments, performing activity 1405 can be similar or identical estimating a prior DOY' for the crop of the agricultural field in a prior crop-growing season of the multiple prior crop-growing seasons as described above with respect to system 300 (FIG. 3) and/or mapping system 408 (FIG. 4). In some embodiments, activity 1405 can be performed as part of activity 1401.

In many embodiments, method 1400 and/or one or more of the activities of method 1400 can be repeated one or more times for different agricultural fields of one or more same and/or one or more different farmed regions.

Turning ahead in the drawings, FIG. 19 illustrates a flow chart for an embodiment of a method 1900 of providing (e.g., manufacturing) a system. The system can be similar or identical to system 300 (FIG. 3). Method 1900 is merely exemplary and is not limited to the embodiments presented herein. Method 1900 can be employed in many different embodiments or examples not specifically depicted or described herein. In some embodiments, the activities of method 1900 can be performed in the order presented. In other embodiments, the activities of method 1900 can be performed in any other suitable order. In still other embodiments, one or more of the activities in method 1900 can be combined or skipped.

In many embodiments, method 1900 can comprise activity 1901 of providing a mapping system. In these or other embodiments, the mapping system can be similar or identical to mapping system 408 (FIG. 4).

In many embodiments, method 1900 can comprise activity 1902 of providing a prescription system. In these or other embodiments, the prescription system can be similar or identical to prescription system 409 (FIG. 4).

In many embodiments, method 1900 can comprise activity 1903 of providing an administration system. In these or other embodiments, the administration system can be similar or identical to administration system 410 (FIG. 4).

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities of FIGS. 7-10 and 14-19 may be comprised of many different activities and be performed by many different modules and in many different orders, that any element of FIGS. 1-19 may be modified, and that the foregoing discussion of certain of these embodiments does not necessarily represent a complete description of all possible embodiments.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
executing one or more first computer instructions configured to generate multiple prior crop-growing season NDVI* maps of an agricultural field, each of the multiple prior crop-growing season NDVI* maps corresponding to different prior crop-growing seasons of the multiple prior crop-growing seasons;
executing one or more second computer instructions configured to determine an apparent emergence date of crop for the agricultural field based on current crop-growing season NDVI* data;
executing one or more third computer instructions configured to compute an average NDVI* map of the agricultural field by averaging corresponding pixels of the multiple prior crop-growing season NDVI* maps to form averaged pixels, the average NDVI* map of the agricultural field comprising the averaged pixels;
executing one or more fourth computer instructions configured to prescribe spatially-variable application rates of one or more nutrients for the agricultural field based on the average NDVI* map of the agricultural field;
wherein: the one or more first computer instructions, the one or more second computer instructions, the one or more third computer instructions, and the one or more fourth computer instructions are configured to run at one or more processors and configured to be stored at one or more non-transitory memory storage devices.

2. The method of claim 1, further comprising:
executing one or more fifth computer instructions configured to receive EOS data of the agricultural field, the EOS data of the agricultural field having been collected on or about a DOY' for the multiple prior crop-growing seasons;
executing one or more sixth computer instructions configured to convert the EOS data of the agricultural field to NDVI data;
executing one or more seventh computer instructions configured to calculate NDVI* data from the NDVI data using scene statistics of the EOS data of the agricultural field,
the multiple prior crop-growing season NDVI* maps being generated from the NDVI* data.

3. The method of claim 1 wherein:
executing the one or more third computer instructions comprises:
executing one or more eighth computer instructions configured to identify at least one prior crop-growing season NDVI* map of the multiple prior crop-growing season NDVI* maps comprising aberrant NDVI* data of the NDVI* data, the aberrant NDVI* data being atypical of expected long-term NDVI* patterns of the agricultural field; and
executing one or more ninth computer instructions configured to exclude the at least one prior crop-growing season NDVI* map of the multiple prior crop-growing season NDVI* maps when averaging the corresponding pixels of the multiple prior crop-growing season NDVI* maps to form the averaged pixels of the average NDVI* map.

4. The method of claim 1 further comprising:
predicting a predicted DOY' for a crop of another agricultural field of a farmed region, the farmed region comprising the agricultural field.

5. The method of claim 1 further comprising: estimating a prior DOY' for the crop of the agricultural field in a prior crop-growing season of the multiple prior crop-growing seasons.

6. The method of claim 1 wherein:
executing the one or more second computer instructions comprises:
executing one or more fifth computer instructions configured to receive EOS data of the agricultural field, the EOS data of the agricultural field having been collected over multiple days of the current crop-growing season;
executing one or more sixth computer instructions configured to convert the EOS data of the agricultural field to NDVI data;
executing one or more seventh computer instructions configured to calculate NDVI* data from the NDVI data using scene statistics of the EOS data of the agricultural field; and
executing one or more eighth computer instructions configured to calculate median NDVI* data from the NDVI* data on the multiple days of the current crop-growing season.

7. The method of claim 6 wherein:
executing the one or more second computer instructions further comprises:
executing one or more ninth computer instructions configured to plot the median NDVI* data as a function of the multiple days of the current crop-growing season.

8. The method of claim 7 wherein: the multiple days of the current crop-growing season comprise multiple consecutive days of the current crop-growing season beginning on a first day of the crop-growing season.

9. The method of claim 7 wherein:
executing the one or more second computer instructions further comprises:
executing one or more tenth computer instructions configured to apply a linear regression to the plot of the median NDVI* data as the function of the multiple days of the current crop-growing season in order to determine a day of the multiple days of the current crop-growing season corresponding to an NDVI* value of the median NDVI* data equal to zero, the day of the multiple days of the current crop-growing season being the apparent emergence date of the crop for the agricultural field.

10. The method of claim 9 wherein: the multiple days of the current crop-growing season comprises multiple consecutive days of the current crop-growing season beginning on a first day of the crop-growing season.

11. The method of claim 1 wherein:

executing the one or more second computer instructions comprises:

executing one or more fifth computer instructions configured to receive EOS data of the agricultural field, the EOS data of the agricultural field having been collected over multiple days of a current crop-growing season;

executing one or more sixth computer instructions configured to convert the EOS data of the agricultural field to NDVI data;

executing one or more seventh computer instructions configured to calculate NDVI* data from the NDVI data using scene statistics of the EOS data of the agricultural field; and executing one or more eighth computer instructions configured to calculate average NDVI* data from the NDVI* data on the multiple days of the current crop-growing season.

12. The method of claim 11 wherein:

executing the one or more second computer instructions further comprises:

executing one or more ninth computer instructions configured to plot the average NDVI* data as a function of the multiple days of the current crop-growing season.

13. The method of claim 12 wherein:

the multiple days of the current crop-growing season comprise multiple consecutive days of the current crop-growing season beginning on a first day of the crop-growing season.

14. The method of claim 12 wherein:

executing the one or more second computer instructions further comprises:

executing one or more tenth computer instructions configured to apply a linear regression to the plot of the average NDVI* data as the function of the multiple days of the current crop-growing season in order to determine a day of the multiple days of the current crop-growing season corresponding to an NDVI* value of the average NDVI* data equal to zero, the day of the multiple days of the current crop-growing season being the apparent emergence date of the crop for the agricultural field.

15. The method of claim 14 wherein:

the multiple days of the current crop-growing season comprise multiple consecutive days of the current crop-growing season beginning on a first day of the crop-growing season.

* * * * *